United States Patent
Dhir et al.

(10) Patent No.: US 11,977,565 B2
(45) Date of Patent: May 7, 2024

(54) AUTOMATED DATA SET ENRICHMENT, ANALYSIS, AND VISUALIZATION

(71) Applicant: PwC Product Sales LLC, New York, NY (US)

(72) Inventors: Amit Dhir, San Jose, CA (US); Henry Huang, New York, NY (US); Michael Reid, Irvine, CA (US); Pradnesh Deshmukh, Mumbai (IN); Vasundhara Rungta, Mumbai (IN); Prachi Agrawal, Mumbai (IN); Pranati Dang, Bangalore (IN); Tarun Sharma, San Jose, CA (US); Vasudeva Sankaranarayanan, Chicago, IL (US); Surya Turlapati, Bangalore (IN); Mathew George, Bangalore (IN)

(73) Assignee: PwC Product Sales LLC, New York, NY (US)

( * ) Notice: Subject to any disclaimer, the term of this patent is extended or adjusted under 35 U.S.C. 154(b) by 73 days.

(21) Appl. No.: 17/579,267

(22) Filed: Jan. 19, 2022

(65) Prior Publication Data

US 2022/0342912 A1    Oct. 27, 2022

Related U.S. Application Data

(60) Provisional application No. 63/180,623, filed on Apr. 27, 2021.

(51) Int. Cl.
*G06F 16/28* (2019.01)
*G06F 16/2458* (2019.01)
*G06N 20/00* (2019.01)

(52) U.S. Cl.
CPC ........ *G06F 16/287* (2019.01); *G06F 16/2462* (2019.01); *G06F 16/285* (2019.01); *G06N 20/00* (2019.01)

(58) Field of Classification Search
CPC .. G06F 16/287; G06F 16/2462; G06F 16/285; G06F 16/28; G06F 16/2458; G06N 20/00
See application file for complete search history.

(56) References Cited

U.S. PATENT DOCUMENTS

| | | | |
|---|---|---|---|
| 2018/0032600 A1* | 2/2018 | English | G06F 16/285 |
| 2020/0372016 A1* | 11/2020 | Rogynskyy | G06Q 10/107 |
| 2022/0253725 A1* | 8/2022 | Feng | G06N 20/00 |

OTHER PUBLICATIONS

Dhir et al., U.S. Appl. No. 17/579,262, filed Jan. 19, 2022, for "Automated Data Set Processing and Visualization for Multi-Module Pricing Insights Graphical User Interface"; 113 pages[A copy is not submitted herewith pursuant to the waiver of 37 C.F.R. § 1.98(a)(2)(iii) issued by the Office dated Sep. 21, 2004.].

(Continued)

*Primary Examiner* — Hosain T Alam
*Assistant Examiner* — Chongsuh Park
(74) *Attorney, Agent, or Firm* — Morrison & Foerster LLP

(57) ABSTRACT

Systems, methods, and graphical user interfaces (GUIs) for ingesting and enriching data regarding a plurality of entities are provided. A first data set comprising company data and a second data set comprising customer data are ingested. The first data set is processed to generate a processed data set. The first data set may be processed by applying an entity matching technique, wherein one or more data elements are generated based on whether an entity of the first data set and an entity of the second data set are commonly associated. The first data set may additionally or alternatively be processed by applying a statistical matching technique, wherein one or more predicted data elements are generated based on similarity between an entity of the first data set and one or more entities of the second data set.

29 Claims, 7 Drawing Sheets

(56) References Cited

OTHER PUBLICATIONS

Dhir et al., U.S. Appl. No. 17/579,273, filed Jan. 19, 2022, for "Systems, Methods, and Graphical User Interfaces for Price Book Generation, Modification, and Visualization"; 78 pages[A copy is not submitted herewith pursuant to the waiver of 37 C.F.R. § 1.98(a)(2)(iii) issued by the Office dated Sep. 21, 2004.].

* cited by examiner

FIG. 3A

Quote Q-01048 — 300

Tabs: Details | Quote Lines | Approvals | Documents | Orders | Quote History | Related | Edit Lines | Preview Approval | Preview Document | Generate Do + Follow | Edit — 322, 324

Details panel (301):
- Quote: Q-01048 (306a)
- Geography: AMER (302)
- Country: United States (306c)
- Channel: Indirect (304c)
- Industry: Manufacturing
- Deal Type: Renewal
- Partner ID: 10000093
- Partner Level: Gold
- Account Size: SME
- End User Category: Local
- [SUBMIT JOB] (310)

304a, 308a, 308c, 304e, 306a

Deal Level: Current Prices vs Intelligent Price Guidelines — 301a

| Current Prices | % Discount | Dollar Price |
|---|---|---|
| List Price | 0% | $16,652.36 |
| Price Post Partner Discount | 19% | $13,731.46 |
| Price Post Volume Discount | 20% | %13,496.31 |
| Invoice Revenue | 34% | $11,053.32 |

314, 312

| Guidelines | % Discount | Dollar Price |
|---|---|---|
| Best in Class | 22% | $13,181.04 |
| Target | 30% | $11,824.44 |
| Floor | 36% | $10,732.81 |

316, 318

Approval Level — 320

| Level | level2 |
|---|---|
| Primary Approver(s) | CRO |
| Secondary Approver(s) | CFO / Global Sales Finance VP |

AUTOMATED DATA SET ENRICHMENT, ANALYSIS, AND VISUALIZATION

CROSS-REFERENCE TO RELATED APPLICATIONS

This application claims the benefit of U.S. Provisional Application No. 63/180,623, filed Apr. 27, 2021, the entire contents of which are incorporated herein by reference.

FIELD

This disclosure relates generally to systems and methods for automated data set enrichment and analysis, and more specifically to systems and methods for ingesting data sets, generating an enriched data set by applying one or more entity matching techniques and/or one or more statistical matching techniques to the ingested data sets, and generating and/or displaying one or more data insights and/or recommendations pertaining to the enriched data set.

BACKGROUND

Data sets may be incomplete, unstructured, and/or inconsistent for many reasons. An incomplete, unstructured, and/or inconsistent data set may be caused by lack of time and/or knowledge needed to input information, improper input of information (e.g., due to human error), and/or data mismatches when aggregating data from various sources (e.g., if only a subset of the sources contain information about a certain variable).

An incomplete, unstructured, and/or inconsistent data set may cause a number of problems for organizations. Incomplete data sets may be problematic at least because many statistical procedures automatically eliminate data entries which are incomplete; doing so may lead to statistically insignificant and/or misleading results, and/or a reduced confidence in the generated results. Unstructured data sets may be problematic at least because data may not be easily stored in a traditional column-row database or spreadsheet, and thus may not be easily searchable. Inconsistent data sets may be problematic at least because one or more variables may be unpopulated for some data entries but populated for others, causing data analysis and/or aggregation of data sets to be more difficult. Thus, an incomplete, unstructured, and/or inconsistent data set may increase the difficulty of generating data insights and/or recommendations.

An incomplete, unstructured, and/or inconsistent data set may increase the difficulty of generating data insights and/or recommendations in a variety of ways. For example, one way to generate data insights and/or recommendations is to apply artificial intelligence and/or machine learning models. However, it may prove infeasible to apply artificial intelligence and/or machine learning on incomplete, unstructured, and/or inconsistent data sets that lack a quality and/or quantity of data needed to train the models. A data set may lack the necessary quality and/or quantity of data for a variety of reasons (e.g., due to an organization's desire to keep proprietary information confidential, and/or due to an incomplete experiment). A machine learning and/or artificial intelligence model that is trained with less data than is necessary may not be able to generate accurate and/or precise results.

Moreover, another way in which to generate data insights and/or recommendations is via manual analysis. However, even for complete, structured, and consistent data sets, manual analysis may be very inefficient, costly, and/or subject to human error; these downsides may be compounded when performing manual analysis on incomplete, unstructured, and/or inconsistent data sets.

When faced with inefficient and/or impractical options to generate data insights and/or recommendations, one may instead turn to generating analyses and/or recommendations based on intuition and/or personal experience. However, performing analyses and making recommendations based on intuition and/or personal experience may lead to inefficient, inconsistent and/or incomplete decision-making. For example, in a business context, such decision-making may lead to margin/revenue leakage, inconsistent prices in the market, longer deal cycle times, unmet sales targets, low customer satisfaction, and/or customer churn. For example, margin leakage may occur if a sales representative quotes a price that is below an economically viable margin. Additionally, such decision-making may lead to an inability to predict customer preferences regarding product prices, volumes, and/or distribution channels.

Thus, there is a need to enrich data sets by generating more complete, more structured, and/or more consistent data sets. Data insights and/or recommendations may be generated and/or displayed using the enriched data sets (e.g., by applying one or more artificial intelligence and/or machine learning models).

SUMMARY

Accordingly, Applicant has developed a system and method to enrich data sets by generating more complete, more structured, and/or more consistent data sets. The system may ingest data sets from a plurality of data sources. Each of the ingested data sets may include information regarding a respective set of entities. The ingested data sets may include at least one common feature and may include one or more common entities. The system may standardize and/or cleanse data included in one or more of the ingested data sets. The system may process one or more of the ingested data sets to generate an enriched data set by applying at least one entity matching technique and/or statistical matching technique. An entity matching technique may associate common entities (and data elements associated with entities) in respective data sets. A statistical matching technique may generate predicted data elements for one or more entities included in a data set based at least in part on one or more entities of another data set that are determined to be similar to the one or more entities. Moreover, the system may generate an enriched data set in real-time such that the enriched data set is modified dynamically as the data sets are modified.

The system may use the enriched data set to generate one or more data insights and/or recommendations. For example, the system may apply one or more artificial intelligence and/or machine learning models to the enriched data set to generate one or more data insights and/or recommendations (e.g., the system may apply one or more segmentation techniques, one or more filtering techniques, one or more sensitivity analyses, and/or one or more optimization analyses). The system may rank a plurality of artificial intelligence and/or machine learning models (e.g., by comparing model performance based on the enriched data set to one or more predefined statistical metrics) and select the best-performing model to generate the one or more data insights. The system may generate and display a visualization of one, some, or all of the generated data insights and/or recommendations.

Thus, by enhancing the quality and/or quantity of data, and by operating in real-time to cater to the context of a problem and provide increased flexibility, the system and method described herein may be used by organizations to generate better, more robust data insights and/or recommendations.

In some embodiments, a system for ingesting and enriching data regarding a plurality of entities is provided, the system comprising one or more processors configured to cause the system to: receive a first data set from a first data source, the first data set comprising information regarding a first set of entities; receive a second data set from a second data source, the second data set comprising information regarding a second set of entities; process the first data set to generate a processed data set, wherein processing the first data set to generate a processed data set comprises, for a first entity in the first set of entities: applying a first entity matching technique to the first data set to associate one or more data elements in the first data set with one or more corresponding elements in the second data set in accordance with a determination that the one or more data elements in the first data set and the one or more data elements in the second data set are commonly associated with the first entity; and applying a statistical matching technique to the first data set to generate a predicted data element for the first entity of the first set of entities, wherein the predicted data element is based at least in part on one or more data elements associated with one or more entities in the second set of entities that are determined to be similar to the first entity; and store the processed data set in a database.

In some embodiments, applying the first entity matching technique comprises: comparing the first entity to each of the entities in the second data set to calculate, for each comparison, a respective similarity value; based at least in part on the plurality of calculated similarity values, selecting one of a plurality of data processing techniques to apply to the first entity; and generating the processed data set in accordance with the selected data processing technique.

In some embodiments, selecting the data processing technique comprises: classifying each of the plurality of calculated similarity values into a respective similarity-value classification of a plurality of predefined similarity-value classifications, wherein each of the similarity-value classifications are based on applying one or more similarity value thresholds to the respective calculated similarity value; classifying the first entity into one of a plurality of match-type classifications based on the plurality of the similarity-value classifications for each of the plurality of calculated similarity values for the first entity; and selecting the data processing technique based on the identity of the match-type classification into which the first entity is classified.

In some embodiments, the plurality of similarity-value classifications include: a first similarity-value classification indicating no similarity between entities; a second similarity-value classification indicating weak similarity between entities; a third similarity-value classification indicating moderate similarity between entities; and a fourth similarity-value classification indicating strong similarity between entities.

In some embodiments, the plurality of match-type classifications include: a first match-type classification indicating zero weak, moderate, or strong similarity-value classifications; a second match-type classification indicating exactly one weak, moderate, or strong similarity-value classification; a third match-type classification indicating a plurality of weak similarity-value classifications with no moderate or strong similarity-value classifications; and one or more fourth match-type classifications indicating one or more moderate or strong similarity-value classifications.

In some embodiments, the one or more processors are configured to cause the system to apply a second entity-matching technique, wherein the second entity-matching technique is applied in response to a determination that a number of entities in the first data set that are classified into the first match-type classification exceeds a threshold number of entities.

In some embodiments, the plurality of data processing techniques include: a first data processing technique comprising not enriching the first entity with any data elements associated from any entity from the second data set; a second data processing technique comprising enriching the first entity with one or more data elements associated with a selected matching entity from the second data set; and a third data processing technique comprising calculating a second similarity value used to select a matching entity from the second data set and enriching the first entity with one or more data elements associated with the selected matching entity.

In some embodiments, calculating respective similarity values comprises determining respective Levenshtein distances.

In some embodiments, calculating respective similarity values comprises applying one or more deep learning models.

In some embodiments, applying the one or more deep learning models comprises applying one or more user-defined weights.

In some embodiments, calculating respective similarity values comprises comparing a string descriptor including one or more of the following: a user name, a user address, a user occupation, an organization name, an organization address, an organization revenue, and an organization headcount.

In some embodiments, applying the statistical matching technique comprises, for the first entity: comparing the first entity to each of the entities in the second data set to calculate, for each comparison, a respective probability value and a respective confidence value; and generating one or more predicted data elements for the first entity for storage in the enriched data, wherein the one or more predicted data elements are based at least in part on corresponding data elements from one or more entities in the second data set, and wherein a manner of generating the predicted data element is selected based at least in part on one or both of the calculated probability values and the calculated confidence values.

In some embodiments, selecting the data processing technique comprises: classifying each of the plurality of statistical-matching technique comparisons of the first entity to a corresponding entity in the second set into a respective statistical-matching-comparison classification of a plurality of predefined statistical-matching-comparison classifications, wherein the classifying into statistical-matching-comparison classifications is based at least in part on one or both of the calculated probability value and the calculated confidence value for each respective statistical-matching comparison; classifying the first entity into one of a plurality of similarity-type classifications based on the plurality of the statistical-matching-comparison classifications for each of the plurality of statistical-matching comparisons for the first entity; and selecting the manner of generating the predicted data element based on the identity of the similarity-type classification into which the first entity is classified.

In some embodiments, the plurality of statistical-matching-comparison classifications include: a first statistical-matching classification indicating low similarity for the pair of compared entities; a second statistical-matching classification indicating moderate similarity for the pair of compared entities; and a third statistical-matching classification indicating high similarity for the pair of compared entities.

In some embodiments, the plurality of match-type classifications include: a first similarity-type classification indicating low similarity for the first entity to the set of entities in the second data set; a second similarity-type classification indicating moderate similarity for the first entity to the set of entities in the second data set; and a third similarity-type classification indicating a high similarity for the first entity to the set of entities in the second data set.

In some embodiments, generating the one or more predicted data elements for storage in the enriched data set comprises extrapolating from multiple entities in the second data set.

In some embodiments, generating the one or more predicted data elements comprises calculating a mean or mode value of data element values for the multiple entities in the second data set.

In some embodiments, the one or more predicted data elements represent a probability value indicating an estimated likelihood that the first entity has a predicted characteristic.

In some embodiments, the first data source is an internal database of a company, and wherein the first data set comprises company data.

In some embodiments, the second data source is an external database comprising customer data pertaining to one or more customer surveys.

In some embodiments, processing the first data set to generate the processed data set is performed in real-time such that the processed data set is modified dynamically as the first data set and the second data set are modified.

In some embodiments, the one or more processors are configured to cause the system to apply one or more artificial intelligence or machine learning models to the processed data set to generate one or more data insights.

In some embodiments, applying the one or more artificial intelligence or machine learning models comprises applying one or more segmentation techniques to the processed data set, wherein the segmentation is based at least in part on a predicted data element generated by the statistical matching technique.

In some embodiments, the one or more processors are configured to add a new entity added to the processed data set by adding the new entity to a preexisting segment based at least in part on a Euclidian distance calculation of a difference between one or more values associated with the new entity and one or more aggregate values associated with preexisting entities included in the preexisting segment.

In some embodiments, applying the one or more artificial intelligence or machine learning models comprises applying one or more filtering techniques to automatically determine one or more similar characteristics among a subset of the entities included in the processed data set.

In some embodiments, applying the one or more artificial intelligence or machine learning models comprises applying one or more sensitivity analyses to determine sensitivity of the first entity relative to variations in one or more variables, wherein the sensitivity analysis is based at least in part on a determination of which entities of the processed data set are similar to the first entity.

In some embodiments, applying the one or more artificial intelligence or machine learning models further comprises applying one or more optimization analyses, wherein the optimization analysis optimizes the one or more variables for which sensitivity was determined by the sensitivity analysis.

In some embodiments, the one or more processors are configured to cause the system to: rank a plurality of artificial intelligence or machine learning models, wherein ranking the models is based at least in part on model performance based on the processed data set relative to one or more predefined statistical metrics; and select the best-performing model to generate the one or more data insights.

In some embodiments, a method for ingesting and enriching data regarding a plurality of entities is provided, the method performed at a system comprising one or more processors, wherein the method comprises: receiving a first data set from a first data source, the first data set comprising information regarding a first set of entities; receiving a second data set from a second data source, the second data set comprising information regarding a second set of entities; processing the first data set to generate a processed data set, wherein processing the first data set to generate a processed data set comprises, for a first entity in the first set of entities: applying a first entity matching technique to the first data set to associate one or more data elements in the first data set with one or more corresponding elements in the second data set in accordance with a determination that the one or more data elements in the first data set and the one or more data elements in the second data set are commonly associated with the first entity; and applying a statistical matching technique to the first data set to generate a predicted data element for the first entity of the first set of entities, wherein the predicted data element is based at least in part on one or more data elements associated with one or more entities in the second set of entities that are determined to be similar to the first entity; and storing the processed data set in a database.

In some embodiments, a non-transitory computer-readable storage medium for ingesting and enriching data regarding a plurality of entities is provided, the non-transitory computer-readable storage medium storing instructions configured to be executed by one or more processors of a system, wherein execution of the instructions by the one or more processors causes the system to: receive a first data set from a first data source, the first data set comprising information regarding a first set of entities; receive a second data set from a second data source, the second data set comprising information regarding a second set of entities; process the first data set to generate a processed data set, wherein processing the first data set to generate a processed data set comprises, for a first entity in the first set of entities: applying a first entity matching technique to the first data set to associate one or more data elements in the first data set with one or more corresponding elements in the second data set in accordance with a determination that the one or more data elements in the first data set and the one or more data elements in the second data set are commonly associated with the first entity; and applying a statistical matching technique to the first data set to generate a predicted data element for the first entity of the first set of entities, wherein the predicted data element is based at least in part on one or more data elements associated with one or more entities in the second set of entities that are determined to be similar to the first entity; and store the processed data set in a database.

In some embodiments, a method for data visualization is provided, the method comprising: displaying a graphical user interface comprising an input region and a visualization region; detecting a first input via the input region of the graphical user interface, the first input specifying a parameter for data set analysis; detecting a second input via the input region of the graphical user interface, the second input indicating an instruction to initiate data set analysis; in response to detecting the second input, generating one or more data insights in accordance with the first input; and displaying the one or more data insights in the visualization region.

In some embodiments, generating one or more data insights is based at least in part on a processed data set.

In some embodiments, the processed data set is generated by applying a first entity matching technique and applying a statistical matching technique, each of which processes data included in a first data set based at least in part on data included in a second data set.

In some embodiments, the first input specifying the parameter comprises one or more of: selection of an option from a drop-down menu; and entry of a string into a field.

In some embodiments, the method comprises: before detecting the second input, detecting a third input via the input region of the graphical user interface, the third input comprising specifying an additional parameter on which data set analysis is based.

In some embodiments, the input region and the visualization region are simultaneously displayed adjacent to one another.

In some embodiments, the visualization region comprises a first visualization portion in which current information is displayed and a second visualization portion in which the one or more data insights are displayed.

In some embodiments, data is automatically populated into the first visualization portion and the second visualization portion in response to detecting the second input.

In some embodiments, the current information of the first visualization portion includes pricing data pertaining to one or more of: a current list price with no discount, a current price after subtracting a partner discount, a current price after subtracting a volume discount, and a current invoice revenue.

In some embodiments, the one or more data insights of the second visualization portion include pricing data pertaining to one or more of: a recommended target price, a recommended best-in-class price, and a recommended floor price.

In some embodiments, a technique used to generate the one or more data insights of the second visualization portion includes one or more of: a segmentation technique, a filtering technique, a sensitivity analysis technique, and an optimization analysis technique; and the second visualization portion includes a graphical visualization of the technique.

In some embodiments, the graphical visualization is simultaneously displayed adjacent to tabular recommendation data.

In some embodiments, the first visualization portion and the second visualization portion are simultaneously displayed adjacent to one another.

In some embodiments, the visualization region comprises a third visualization portion in which approval information in displayed, wherein the approval information includes data pertaining to one or more users associated with permissions for approval of data included in one or both of the first visualization portion and the second visualization portion.

In some embodiments, a system for data visualization is provided, the system comprising one or more processors configured to cause the system to: display a graphical user interface comprising an input region and a visualization region; detect a first input via the input region of the graphical user interface, the first input specifying a parameter for data set analysis; detect a second input via the input region of the graphical user interface, the second input indicating an instruction to initiate data set analysis; in response to detecting the second input, generate one or more data insights in accordance with the first input; and display the one or more data insights in the visualization region.

In some embodiments, a non-transitory computer-readable storage medium for data visualization, the non-transitory computer-readable storage medium storing instructions configured to be executed by one or more processors of a system, wherein execution of the instructions by the one or more processors causes the system to: display a graphical user interface comprising an input region and a visualization region; detect a first input via the input region of the graphical user interface, the first input specifying a parameter for data set analysis; detect a second input via the input region of the graphical user interface, the second input indicating an instruction to initiate data set analysis; in response to detecting the second input, generate one or more data insights in accordance with the first input; and display the one or more data insights in the visualization region.

In some embodiments, any one or more of the features or aspects of any of the embodiments recited above may be combined in whole or in part with one another, and/or may be combined in whole or in part with any other feature or aspect disclosed herein.

BRIEF DESCRIPTION OF THE DRAWINGS

Various embodiments are described with reference to the accompanying figures, in which:

FIGS. 3A-3B show graphical user interfaces for visualizing data insights and/or recommendations generated from an automated data set enrichment and analysis system, according to some embodiments.

DETAILED DESCRIPTION

Described herein are automated data set enrichment and analysis systems and methods. In particular, provided herein are systems and methods for receiving a data set that is incomplete, unstructured, and/or inconsistent; enriching the data set with data included in one or more other data sets; generating one or more data insights and/or recommendations pertaining to the enriched data set; and generating and displaying a visualization of the data insights and/or recommendations. Systems and methods provided herein may enable users to more efficiently, more accurately, and/or more precisely analyze and generate data-driven decisions pertaining to complex and/or disparate data sets. The systems, methods, and techniques disclosed herein may address the problems and shortcoming of known systems as described above.

Figure 1:
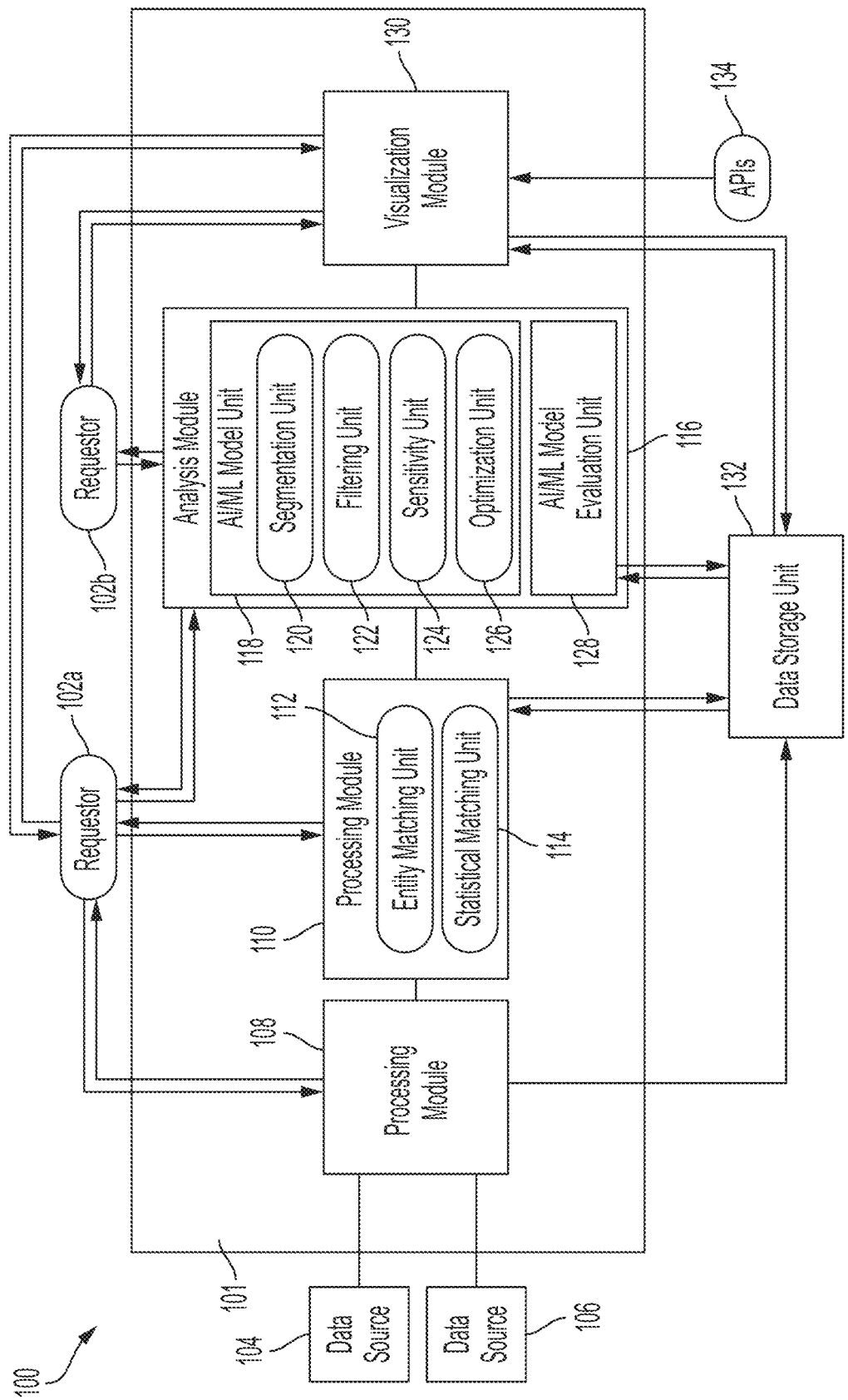
FIG. 1 depicts a system architecture of an automated data set enrichment and analysis system, according to some embodiments.

FIG. 1 depicts an automated data set enrichment and analysis system 100, according to some embodiments. Automated data set enrichment and analysis system 100 may comprise data set enrichment and analysis tool 101 that can comprise any computer, processor, server, etc. that is configured to execute a method of data set enrichment and analysis as described herein. Data set enrichment and analysis tool 101 may comprise preprocessing module 108, processing module 110, analysis module 116, and/or visualization module 130, as described further below. The preprocessing module 108, processing module 110, analysis module 118, and visualization module 130 may be provided by the same computer, processer, or server; additionally or alternatively, one or more of said modules may be provided by a different computer, processor, or server (e.g., tool 101 and/or system 100 may be provided in whole or in part as a server-hosted computing system, a distributed computing system, and/or a cloud-based computing system).

In some embodiments, data set enrichment and analysis tool 101 may be provided via a cloud-based web-application. The web-application may advantageously enable a user to more securely and/or more quickly ingest data, generate data insights and/or recommendations, and visualize the generated data insights and/or recommendations. The web-application may enhance data security by (1) controlling data access (e.g., via an entitlement framework) and securing all endpoints (e.g., via transport layer security (TLS)); (2) encrypting stored data (e.g., by using AES256 and/or AES128) and validating all data inputs before performing a computation; and/or (3) automatically auditing platform activities and enterprise integrations and generating alerts based on certain actions taken. The web-application may enable a user to more quickly ingest data, generate data insights and/or recommendations, and visualize the generated data insights and/or recommendations by leveraging a number of pre-built and/or custom tools that ingest data, clean ingested data, enrich ingested data, analyze enriched data to generate data insights and/or recommendations, and/or visualize data insights and/or recommendations, as will be explained further below.

In some embodiments, automated data set enrichment and analysis system 100 can include requestor 102a, requestor 102b (each of which may be a user device and/or user system), first data source 104, second data source 106, storage unit 132, and/or APIs 134, each of which may be communicatively coupled (e.g., by wired or wireless network communication) with data set enrichment and analysis tool 101. In some embodiments, requestor 102a, requestor 102b, first data source 104, second data source 106, storage unit 116, storage unit 132, and/or APIs 134 may be included within data set enrichment and analysis tool 101.

In some embodiments, requestor 102a may be a user device associated with an analyst of system 100. In some embodiments, requestor 102b may be a user device associated with a salesperson of system 100. In some embodiments, requestor 102a and/or requestor 102b may interact with system 100 by viewing a graphical user interface associated with the system and/or by providing one or more inputs via the graphical user interface. In some embodiments, the graphical user interface may be rendered and/or caused to be displayed via a graphical user interface module (not shown in FIG. 1) that is configured to generate and/or provide one or more instructions for rendering and/or displaying the graphical user interface. In some embodiments, each of requestor 102a and requestor 102b may be associated with a permission setting to access and/or provide inputs to one or more screens of the graphical user interface. A screen of the graphical user interface may be associated with a specific function of the system. For example, in some embodiments, requestor 102a may have permission to access all screens, and thus have permission to control preprocessing, processing, analysis, and visualization functionalities of the system. Contrastingly, in some embodiments, requestor 102b may have permission to access a subset of screens (e.g., those screens associated with analysis and visualization), and thus have permission to control only a subset of functionalities of the system (e.g., analysis and visualization functionalities). While described with respect to two requestors, including an administrator type of requestor and a salesperson type of requestor, system 100 may include any number of requestors and any type of requestor, each of which may be associated with a permission to control any one or more functionalities of system 100.

In some embodiments, requestor 102a may initiate data set enrichment and analysis by selecting one or more inputs to tool 101. In some embodiments, inputs received from requestor 102a may indicate instructions to upload one or more data sets, an indication of a selection of one or more data sets, instructions to execute one or more preprocessing operations, and/or instructions to configure one or more preprocessing operations. For example, requestor 102a may provide a selection of one or more data sets included in first data source 104 and/or one or more data sets included in second data source 106. In some embodiments, a summary and/or image of a portion of the data included in a data set may be presented in the graphical user interface of system 100 (e.g., in a document or an image gallery which displays to a user information about one or more data sets at a time).

First data source 104 and/or second data source 106 may serve as a data source for data set enrichment and analysis. First data source 104 and second data source 106 may each include one or more suitable computer storage mediums. In some embodiments, first data source 104 may comprise a first data set that may include information regarding a first set of entities (e.g., data pertaining to customers of an internal company, wherein a customer may be an external company with which the internal company does business). In some embodiments, second data source 106 may comprise a second data set that may include information regarding a second set of entities (e.g., data pertaining to companies listed in the New York Stock Exchange (NYSE)). In some embodiments, the first set of entities and the second set of entities may include at least one common feature (e.g., the name of a customer may be the same as the name of a company listed in the NYSE).

In some embodiments, data source 104 and/or data source 106 may comprise one or more databases which organize stored data sets. Each database may support data structures such as strings, integers, hashes, tables, arrays, lists, tuples, stacks, queues, sets, bitmaps, trees, graphs, any combination thereof, or the like. In some embodiments, data source 104 is an internal database of a company, comprising company data. In some embodiments, data source 106 is an external database (e.g., comprising customer data pertaining to one or more customer surveys). The external database may be used to enrich the internal database, thereby creating a more complete, broader ("enriched") database from which data-driven insights may be gleaned. In some embodiments, in response to a requestor selection of the first data set within data source 104, requestor 102a may select—or system 100 may automatically select—the second data set within data source 106 with which to enrich the selected first data set. In some embodiments, the second data set may be selected based at least in part on a similarity between the first data set and the second data set (e.g., one or more common entities included in both data sets). While data source 104 has been described with respect to an internal database comprising company data and data source 106 has been described with respect to an external database comprising customer data, data source 104 and data source 106 may each be configured to store and/or organize any data.

In some embodiments, a plurality of internal databases and/or a plurality of external databases may be used to generate an enriched database. Using a plurality of internal databases and/or a plurality of external databases to generate an enriched database may be advantageous at least to create as complete and broad an enriched database as possible (e.g., a database may comprise information that other databases lack). Some or all of the internal databases may be received from the same data source, or each of the internal databases may be received from a different data source (e.g., a different business unit within a company). Similarly, some or all of the external databases may be received from the same data source, or each of the external databases may be received from a different data source (e.g., a different customer survey). Thus, while FIG. 1 is shown to include two data sources and described with respect to ingesting data from one data set within each data source, system 100 may include any number of data sources used to ingest data from any number of data sets.

In some embodiments, data may be ingested from first data source 104 and/or from second data source 106 to data set enrichment and analysis tool 101. For example, the cloud-based web-application described above may directly connect to and pull data from data source 104 and/or data source 106, thus minimizing unnecessary data exposure and maximizing data security. In some embodiments, data is ingested from a data source via an Apache Hadoop Distributed File System (HDFS) and/or via Microsoft Windows Azure Storage Blob (WASB). A folder structure may be used to organize the ingested data for further processing. A folder structure may be created and used based at least in part on a required folder structure associated with the data ingestion method and/or on a required folder structure associated with a file storage system (e.g., a database) of tool 101 into which the ingested data may be stored. In some embodiments, additionally or alternatively to data source 104 and data source 106, data may be ingested directly from a platform (e.g., Salesforce's Customer Relationship Management (CRM) platform and/or Salesforce's Configure, Price, Quote (CPQ) platform) to tool 101 (e.g., via one or more APIs).

Preprocessing module 108 of tool 101 may receive the user request to initiate data set enrichment and analysis. Preprocessing module 108 may be configured to receive one or more data sets from one or more data sources based on one or more selection inputs, and generate, based on the received data sets, preprocessed data sets. For example, in response to a request from requestor 102*a* to analyze a first data set included in a company database comprised within data source 104, preprocessing module 108 may receive the first data set and a second data set included in a customer survey database comprised within data source 106. In some embodiments, preprocessing module 108 may perform preprocessing operations including one or more of: standardizing a data set (e.g., converting data to a common format to enable processing and analysis), and cleansing a data set (e.g., replacing, modifying, or deleting corrupt, incomplete, incorrect, inaccurate, or irrelevant entries; fixing structural errors, such as typos or inconsistent naming conventions; and/or filtering unwanted outliers). Standardizing and/or cleansing a data set may be advantageous at least to increase the validity, accuracy, completeness, consistency, and/or uniformity of a data set. In some embodiments, preprocessing module 108 may be configured to transmit the preprocessed data sets to a data storage medium (e.g., storage unit 132) and/or processing module 110.

Processing module 110 may be configured to receive the preprocessed data sets and generate, based on the preprocessed data sets, an enriched data set. Specifically, processing module 110 may be used to enrich company data included in the first data set with customer data included in the second data set. In some embodiments, processing module 110 may comprise entity matching unit 112, which may be configured to process the preprocessed data sets by applying a first entity matching technique to the first data set. The first entity matching technique may associate one or more data elements in the first data set with one or more corresponding data elements in the second data set. The first entity matching technique may determine correspondence between data elements in the first data set and data elements in the second data set based at least in part on a determination that the one or more data elements included in the first data set and the one or more data elements included in the second data set are associated with a common entity. In some embodiments, entity matching unit 112 may additionally or alternatively be configured to apply a second entity matching technique to associate one or more data elements in the first data set with one or more corresponding data elements in the second data set.

In some embodiments, processing module 110 may comprise statistical matching unit 114, which may be configured to process the preprocessed data sets by applying a statistical matching technique to the first data set. The statistical matching technique may generate a predicted data element for one or more entities included in the first data set. The predicted data element may be based at least in part on one or more data elements associated with one or more entities in the second data set that are determined to be similar to an entity included in the first data set.

Thus, entity matching unit 112 and statistical matching unit 114 may enrich company data included in the first data set with customer data included in the second data set to generate an enriched data set. In some embodiments, processing module 110 may be configured to store the enriched data set on a data storage medium (e.g., storage unit 132). In some embodiments, the enriched data set may alternatively or additionally be stored in first data source 104 and/or second data source 106, at least to enable a user to easily compare the original data sets to the enriched data set. In some embodiments, processing module 110 may be configured to transmit the enriched data set to analysis module 116.

In some embodiments, analysis module 116 may be configured to receive the enriched data set and generate, based on the enriched data set, one or more data insights and/or recommendations. In some embodiments, analysis module 116 may be configured to analyze the enriched data set in accordance with one or more user inputs (e.g., in accordance with an analysis input by requestor 102*b* executed via the graphical user interface associated with system 100). In some embodiments, analysis module 116 may be configured to analyze the enriched data set via a distributed computation cluster, which may advantageously reduce the computing time needed to analyze the data set and generate data insights and/or recommendations. In some embodiments, some or all of the data insights and/or recommendations may be generated by applying one or more artificial intelligence and/or machine learning models to the enriched data set. For example, as shown in FIG. 1, analysis module 116 may include AI/ML model unit 118, which may be configured to apply one or more artificial intelligence models and/or one or more machine learning models to the enriched data set.

In some embodiments, the generated data insights and/or recommendations may be generated from one or more types of data analysis techniques. The types of data analysis techniques may include one or more of: a segmentation technique to divide the enriched data set into one or more groups; a filtering technique to automatically determine one or more similar characteristics among a subset of the entities included in the enriched data set; a sensitivity technique to determine sensitivity of an entity included in the enriched data set relative to variations in one or more variables; and an optimization technique to optimize the one or more variables for which sensitivity was determined. For example, as shown in FIG. 1, AI/ML model unit 118 may include segmentation unit 120, filtering unit 122, sensitivity unit 124, and optimization unit 126.

In some embodiments, analysis module 116 may include AI/ML model evaluation unit 128, which may be configured to evaluate the one or more artificial intelligence and/or machine learning models applied to the enriched data set. Evaluation unit 128 may evaluate the models based at least in part on model performance relative to one or more predefined statistical metrics. In some embodiments, evaluation unit 128 may evaluate model performance for one, some, or all types of data analysis techniques performed on the enriched data set. Upon evaluating the models, evaluation unit 128 may select the best-performing model to generate the one or more data insights and/or recommendations pertaining to the enriched data set.

Thus, analysis module 116 may generate one or more data insights and/or recommendations pertaining to the enriched data set. In some embodiments, analysis module 116 may be configured to store the data insights on a data storage medium (e.g., storage unit 132). Thus, in some embodiments, the data insights and/or recommendations may be stored in conjunction with the enriched data set generated by processing module 110. This may be advantageous at least to enable a user to easily map the data insights and/or recommendations with the associated enriched data set. In some embodiments, analysis module 116 may be configured to transmit the data insights and/or recommendations to visualization module 130.

In some embodiments, visualization module 130 may be configured to receive the data insights and/or recommendations and generate and display a visualization of the data insights and/or recommendations. In some embodiments, visualization module 130 may interface with one or more connectors (e.g., APIs 134, which may be rest based Java APIs built on any platform, such as MuleSoft's Anypoint Platform) to generate and display the visualization. In some embodiments, the visualization of the data insights and/or recommendations may be displayed on any platform. In some embodiments, the visualization of the data insights and/or recommendations may be platform agnostic by leveraging connectors which are configured to integrate with a wide range of platforms.

In some embodiments, the visualization of the data insights and/or recommendations may be displayed on the same platform used to request initiation of data set enrichment and analysis (e.g., a CRM platform and/or a CPQ platform, such as Salesforce). Displaying the visualization on the same platform used to request initiation of data set enrichment and analysis may advantageously (1) enable real-time use such that a user may perform multiple analyses and/or test different scenarios ("what-if" testing) without needing to access a separate user interface; (2) simultaneously display the criteria used to initiate data set enrichment and analysis and the outcome of the data set enrichment and analysis in the same user interface; and/or (3) maximize ease-of-use, thereby lowering training costs. In some embodiments, the visualization may simultaneously be displayed on a plurality of user devices, such that a plurality of users have access to the data insights.

In some embodiments, visualization module 130 may be configured to store the data insights and/or recommendations on a data storage medium (e.g., storage unit 132). Thus, in some embodiments, the data visualizations may be stored in conjunction with the enriched data set and/or the associated data insights and/or recommendations. This may be advantageous at least to enable a user to easily map the data visualizations with the associated enriched data set and/or with the associated data insights and/or recommendations.

Figure 2A:
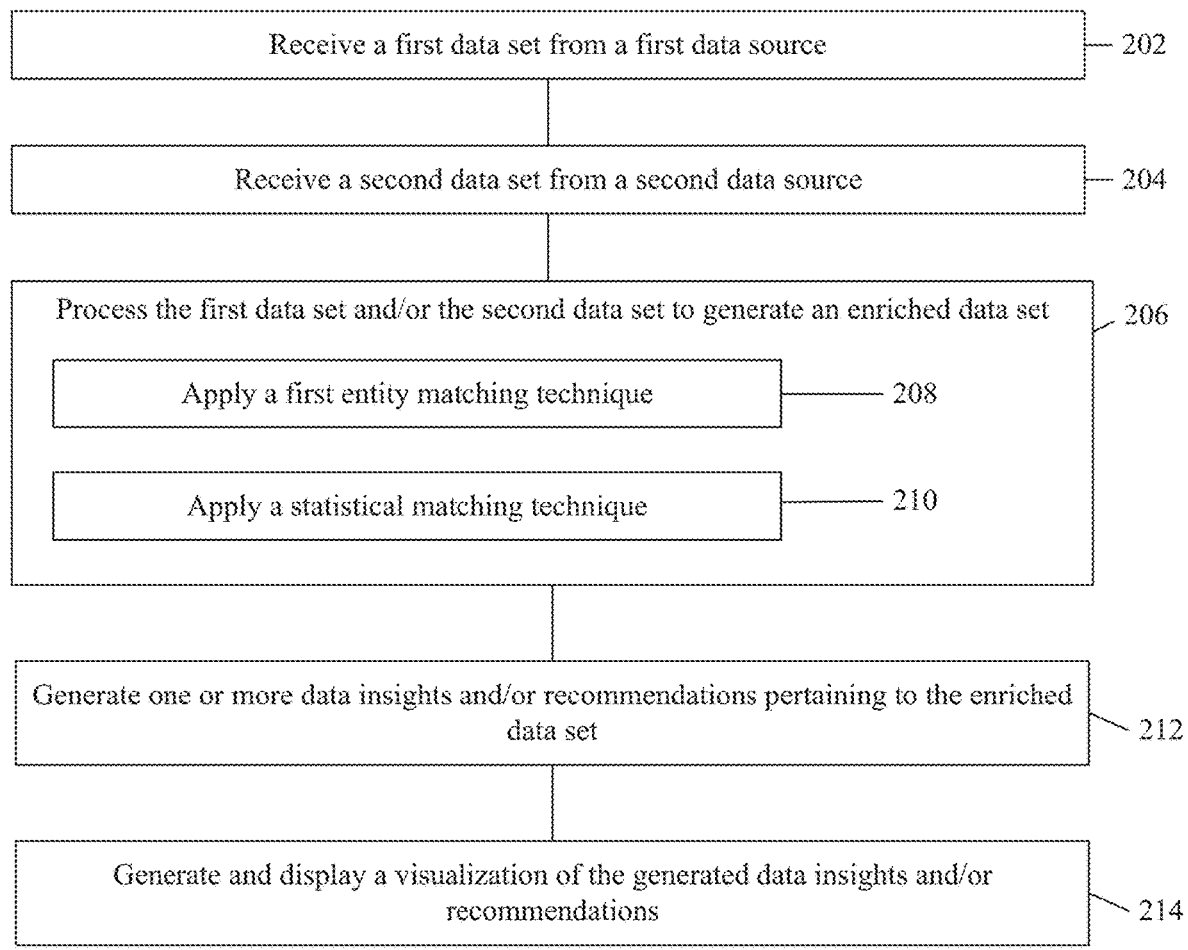
FIGS. 2A-2C depict flowcharts of a method for using an automated data set enrichment and analysis system, according to some embodiments.
Figure 2B:
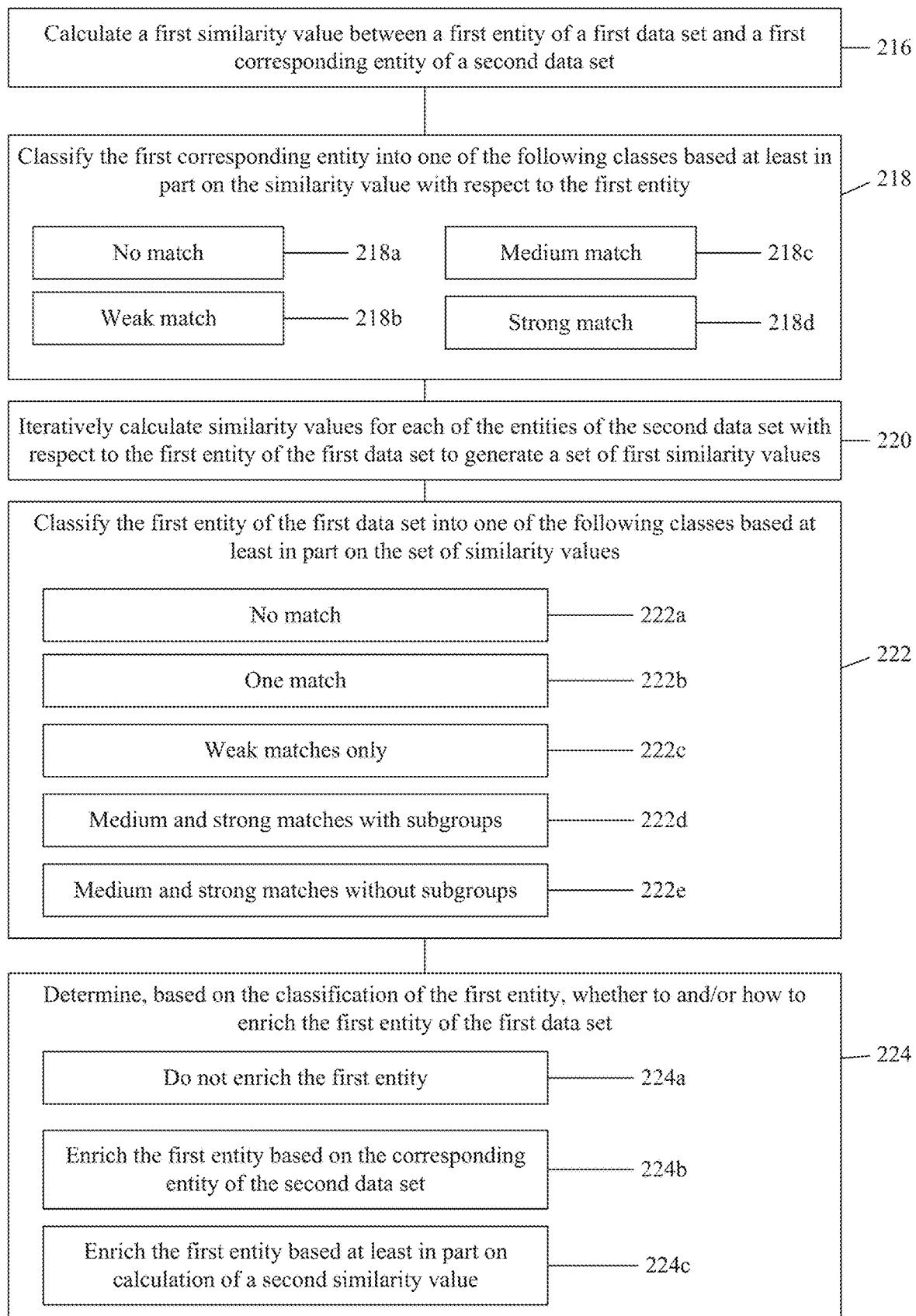
Figure 2C:
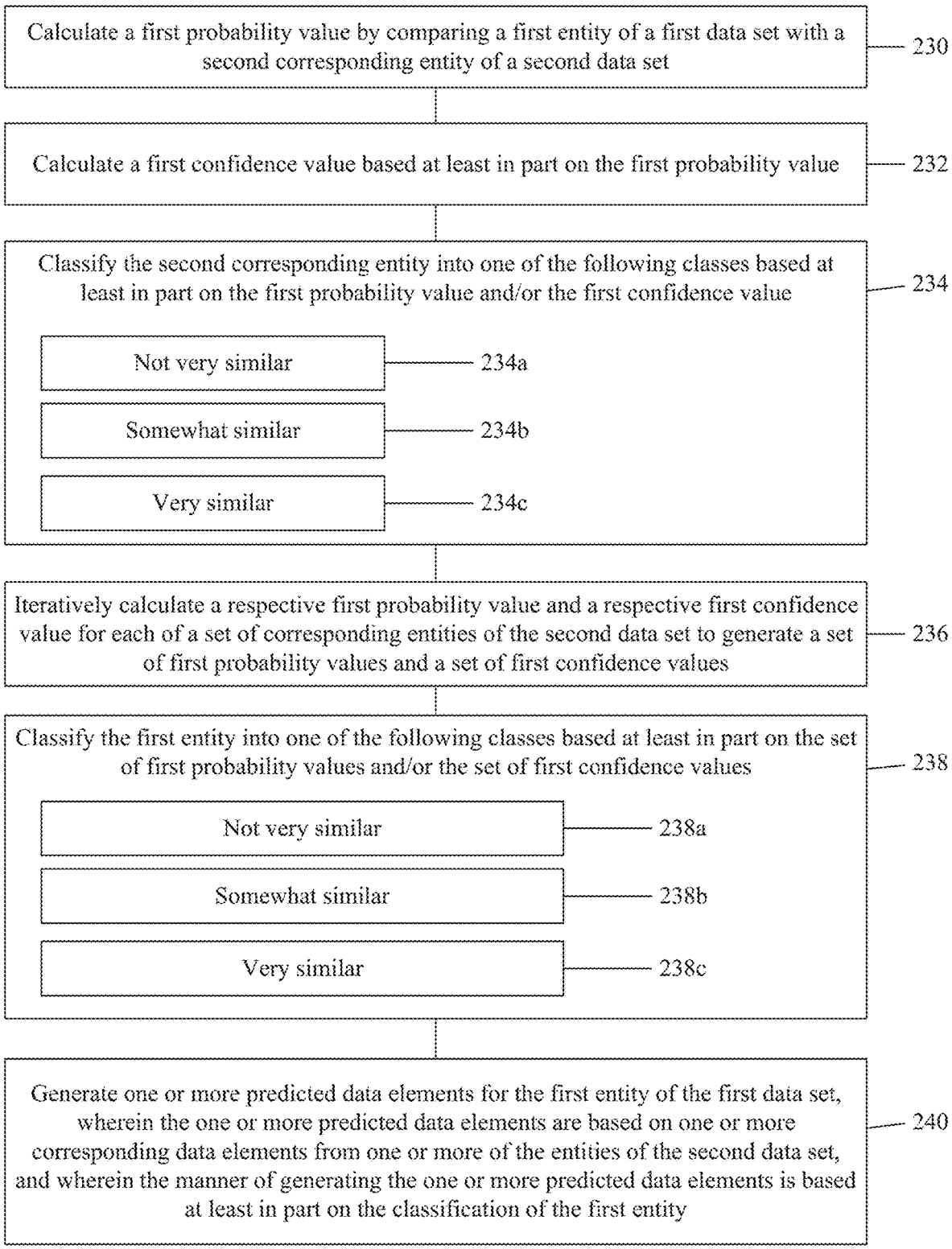

FIGS. 2A-2C depict flowcharts of a method for using an automated data set enrichment and analysis system, according to some embodiments. As shown, FIG. 2A depicts a method by which an automated data set enrichment and analysis system (e.g., automated data set enrichment and analysis system 100 of FIG. 1) generates data visualizations by generating data insights and/or recommendations based on data included in an enriched data set. In some embodiments, using an automated data set enrichment and analysis system may include performing any one or more of the steps of FIG. 2A.

At block 202, in some embodiments, a requestor (e.g., requestor 102a of FIG. 1) may send an input to a data set enrichment and analysis tool. In some embodiments, this step may include initiating data set enrichment and analysis by providing an input to an automated data set enrichment and analysis system (e.g., automated data set enrichment and analysis system 100 of FIG. 1). In some embodiments, as discussed above, the input may comprise a selection of one or more data sets (e.g., first data set stored in data source 104) that may be a subject of the data source enrichment and analysis.

In some embodiments, a preprocessing module (e.g., preprocessing module 108 of FIG. 1) of a data set enrichment and display tool may receive the input (e.g., the selected and/or uploaded first data set which comprises company data regarding a first set of entities).

At block 204, in some embodiments, a preprocessing module (e.g., the same preprocessing module which receives the first data set) may receive a second data set comprising customer data regarding a second set of entities. As discussed above, in some embodiments, the preprocessing module may receive the second data set based on the input, or may automatically receive the second data set based at least in part on a determined similarity (e.g., one or more common features) between an entity of the first data set and an entity of the second data set. In some embodiments, the first data set and the second data set may be simultaneously received. In some embodiments, the second data set may be received after the first data set is received.

In some embodiments, the preprocessing module may preprocess the received first data set and/or the received second data set by performing preprocessing operations including one or more of: standardizing a data set (e.g., converting data to a common format to enable processing and analysis), and cleansing a data set (e.g., replacing, modifying, or deleting corrupt, incomplete, incorrect, inaccurate, or irrelevant entries; fixing structural errors, such as typos or inconsistent naming conventions; and/or filtering unwanted outliers), as discussed above. In some embodiments, the preprocessing module may be configured to transmit the preprocessed data sets to a processing module (e.g., processing module 110 of FIG. 1).

At block 206, in some embodiments, the processing module may generate an enriched data set based on the preprocessed first data set and second data set. In some embodiments, the processing module may enrich company data included in the first data set with customer data included in the second data set. In some embodiments, the processing module may generate the enriched data set in real-time, such that the enriched data set may be modified dynamically as the first data set and/or the second data set are modified. As discussed above, generating an enriched data set may be important at least to generate a more complete, more structured, and/or more consistent data set that can then be used to generate one or more data insights and/or recommendations. In some embodiments, the processing module may generate an enriched data set by applying a first entity matching technique to the first data set, at Step 208, and/or by applying a statistical matching technique to the first data set, at Step 210. FIG. 2B depicts a flowchart of a method for applying a first entity matching technique; in some embodiments, applying the first entity matching technique at block 208 in FIG. 2A may include performing any one or more of the steps of FIG. 2B. Similarly, FIG. 2C depicts a flowchart of a method for applying a statistical matching technique; in some embodiments, applying the statistical matching technique at block 210 in FIG. 2A may include performing any one or more of the steps of FIG. 2C.

At block 208, in some embodiments, the first entity matching technique may associate one or more data elements associated with a first entity in the first data set with one or more corresponding data elements associated with a first corresponding entity in the second data set. In some embodiments, the first entity matching technique may associate the first entity in the first data set with the first corresponding entity in the second data set in accordance with a determination that the one or more data elements in the first data set and the one or more data elements in the second data set are commonly associated with the first entity (e.g., that the first entity in the first data set and the first corresponding entity in the second data set refer to the same entity).

As discussed above, FIG. 2B depicts a flowchart of a method for applying a first entity matching technique, according to some embodiments.

At block 216, in some embodiments, applying the first entity matching technique may comprise calculating a first similarity value between the first entity of the first data set and the first corresponding entity of the second data set. In some embodiments, the first similarity value may be indicative of an amount of overlap between the first entity and the first corresponding entity. In some embodiments, the similarity value may be calculated based at least in part by comparing one or more identifying features associated with the first entity of the first data set with one or more corresponding identifying features associated with the first corresponding entity of the second data set. In some embodiments, the identifying features may comprise a string descriptor including a user name, a user address, a user occupation, an organization name, an organization address, an organization revenue, and/or an organization headcount. The identifying features may be comprised within any data field associated with the first entity and/or the first corresponding entity, and may include any number of characters (e.g., the string can be any length).

In some embodiments, the first similarity value may be calculated by determining a mathematical distance between one or more corresponding features of the first entity and the first corresponding entity and/or by inputting corresponding features of the first entity and the first corresponding entity into one or more artificial intelligence or machine learning models. In some embodiments, the mathematical distance between a feature of the first entity and a feature of the first corresponding entity may be calculated using any string similarity technique. The string similarity technique may be an edit-distance-based technique (e.g., the Hamming distance, Levenshtein distance, or Jaro-Winkler technique), which computes the number of single character edits needed to transform one string to another; a token-based technique (e.g., the Jaccard index or Sorensen-Dice coefficient technique), which determines the number of similar "tokens" (substrings) between data strings; a sequence-based technique (e.g., the Ratcliff-Obershelp technique), which determines the longest common subsequence between data strings; a text vectorization technique (e.g., the bag or words technique or the Word2Vec technique), which computes the temporal and semantic similarity of strings; or the like. In some embodiments, the string similarity technique used may be a Levenshtein distance calculation. In some embodiments, the Levenshtein distance calculation may be used at least because it is a computationally effective algorithm, and is therefore capable of being applied for large data sets that include many entities. In some embodiments, the one or more artificial intelligence or machine learning models may be a deep learning model. In some embodiments, the features input into the deep learning model may be weighted according to one or more user-defined weights indicating the relative importance of each feature.

In some embodiments, a determination of whether the first entity corresponds to the first corresponding entity may be based at least in part on the calculated first similarity value. In some embodiments, the first entity and the first corresponding entity are determined to correspond if the calculated first similarity value exceeds a predefined and/or user-defined minimum similarity threshold.

At block 218, in some embodiments, the determination of whether the first entity corresponds to the first corresponding entity may comprise classifying the first corresponding entity based at least in part on the calculated first similarity value. In some embodiments, the first corresponding entity may be classified into a class selected from a plurality of classes. (Presented another way, the correspondence between the first entity and the first corresponding entity may be classified, such that the strength of correspondence or strength of similarity is classified.) In some embodiments, one, some, or each of the classes may be predefined classes. In some embodiments, one, some, or each of the classes may be defined with respect to a strength of inter-association of entities in the class.

In some embodiments, the first corresponding entity may be classified into one of the plurality of classes according to predefined respective ranges of similarity values for each of the plurality of classes. In some embodiments, the classes may comprise one or more of the following: a class indicating that no match has been detected between the first entity and the first corresponding entity (e.g., class 218a of FIG. 2B); a class indicating that a weak match has been detected between the first entity and the first corresponding entity (e.g., class 218b of FIG. 2B); a class indicating that a medium match has been detected between the first entity and the first corresponding entity (e.g., class 218c of FIG. 2B); and a class indicating that a strong match has been detected between the first entity and the first corresponding entity (e.g., class 218*d* of FIG. 2B).

In some embodiments, the first corresponding entity may be classified into the class indicating that no match has been detected if the calculated first similarity value is less than the minimum similarity threshold. In some embodiments, the first corresponding entity may be classified into the class indicating that a weak match has been detected if the calculated first similarity value is greater than the minimum similarity threshold but the corresponding strings are not very similar (e.g., in the case of a complex match, such as matching "IBM" to "International Business Machine"). In some embodiments, the first corresponding entity may be classified into the class indicating that a strong match has been detected if the corresponding strings are very similar (e.g., in the case of a simple match, such as matching "Facebook" to "Facebook Inc.").

At block 220, in some embodiments, the first entity matching technique may be applied in an iterative manner to determine all entities of the second data set that correspond to the first entity of the first data set. Thus, applying the first entity matching technique may comprise calculating a respective first similarity value between the first entity of the first data set and each entity of the second data set. This iterative approach may be advantageous at least to find the data entity in the second data set which is most similar to the first entity of the first data set. In some embodiments, each respective first similarity value may be calculated in a similar manner to that described with respect to block 216. In some embodiments, each entity of the second data set may be classified in a similar manner to that described with respect to block 218. Thus, in some embodiments, the first entity matching technique may be applied to calculate a set of first similarity values, each of which represents a similarity comparison between the first entity of the first data set and an entity of the second data set. In some embodiments, the set of first similarity values may represent a candidate set that includes possible matches (e.g., weak, medium, and/or strong matches) between the first entity of the first data set and entities of the second data set.

At block 222, in some embodiments, after calculating the set of first similarity values for the first entity of the first data set, the first entity of the first data set may be classified into one of a plurality of classes. In some embodiments, the classes may comprise one or more of the following: a class indicating that no match has been detected between the first entity and an entity of the second data set (e.g., class 222*a* of FIG. 2B); a class indicating that one match has been detected between the first entity and an entity of the second data set (e.g., class 222*b* of FIG. 2B); a class indicating that only weak matches have been detected between the first entity and entities of the second data set (e.g., class 222*c* of FIG. 2B); a class indicating (1) that medium and/or strong matches have been detected between the first entity and entities of the second data set, and (2) that a subset of the matches are similar to each other (e.g., class 222*d* of FIG. 2B); and a class indicating (1) that medium and/or strong matches have been detected between the first entity and entities of the second data set, and (2) that each match is sufficiently distinct from other matches (e.g., class 222*e* of FIG. 2B). In some embodiments, the first entity may be classified into one of the plurality of classes based at least in part on the same predefined respective ranges described with respect to block 218.

In some embodiments, upon classifying the first entity into one of the plurality of classes, one or more corresponding entities of the second data set may be grouped into the class. For example, if a first corresponding entity were classified into class 218*b*, indicating a weak match between the first entity and the first corresponding entity, and no other matches were detected between the first entity and other entities of the second data set, the first entity may be classified into class 222*b* and the first corresponding entity may be grouped into class 222*b*. Thus, each class may include an indication of the one or more entities of the second data set upon which classification of the first entity is based.

At block 224, in some embodiments, a determination of whether to and/or how to enrich the first entity of the first data set may be made based at least in part on the classification of the first entity.

At block 224*a*, in some embodiments, if the first entity is classified into class 222*a*, indicating that no match has been detected, no enrichment may occur, and unfilled data fields may be left empty and/or may be filled to indicate that no match was found (e.g., unfilled data fields may be filled with the string "null").

At block 224*b*, in some embodiments, if the first entity is classified into class 222*b*, indicating that one match has been detected, the first entity may be enriched based on the corresponding entity of the second data set that is grouped into class 222*b*. In some embodiments, the first entity of the first data set may be enriched by associating one or more features (e.g., customer habit information) and corresponding data (e.g., customer habit data) associated with the identified corresponding entity of the second data set with the first entity of the first data set. Thus, if the first entity of the first data set were previously associated with a company sales information feature (and corresponding company sales data), once enriched, the first entity of the first data set may be associated with both the company sales information feature and a customer habit information feature (and corresponding customer habit data).

At block 224*c*, in some embodiments, if the first entity of the first data set is classified into any of the other classes (e.g., class 222*c*, class 222*d*, or class 222*e*), the first entity of the first data set may be enriched based at least in part on calculation of a second similarity value. In some embodiments, the second similarity value may be representative of a similarity between the first entity of the first data set and a corresponding entity of the second data set that is grouped in a respective candidate set (e.g., grouped into class 222*c*, class 222*d*, or class 222*e*). In some embodiments, calculation of the second similarity value may comprise comparing one or more additional features of the first entity of the first data set with one or more additional features of each of the entities of the second data grouped into a respective candidate set. This may be advantageous at least if more than one entity of the second data set grouped into a respective candidate set produces the same first similarity value (within error) when compared to the first entity of the first data set. In some embodiments, the second similarity value may be calculated in the same manner as was the first similarity value (e.g., according to a Levenshtein distance calculation). In some embodiments, the second similarity value may be calculated in a different manner compared to the first similarity value (e.g., by applying a different string similarity technique described with respect to block 216). In some embodiments, the second similarity value may be calculated in a different manner compared to the first similarity value based on a determination of which string similarity technique is best able to measure similarity between the first entity of the first data set and the entities of the second data set that are grouped into a respective candidate set.

In some embodiments, if the first entity of the first data set is classified into class 222c, indicating that only weak matches have been detected between the first entity and entities of the second data set, a respective second similarity value may be calculated for each entity of the second data set grouped into class 222c. In some embodiments, the respective second similarity values may be compared and/or ranked. In some embodiments, the corresponding entity of the second data set grouped into class 222c that produces the highest second similarity value when compared to the first entity of the first data set (e.g., the corresponding entity ranked as the best match) may be selected to enrich the first entity of the first data set. In some embodiments, the first entity of the first data set may be enriched in the same manner described with respect to block 224b.

In some embodiments, if the first entity of the first data set is classified into class 222d, indicating (1) that medium and/or strong matches have been detected between the first entity and entities of the second data set, and (2) that a subset of the matches are similar to each other, a respective second similarity value may be calculated for each entity of the second data set grouped into class 222d. In some embodiments, a plurality of entities of the second data set may be grouped into one or more subgroups within class 222d. In some embodiments, entities may automatically be grouped into a subgroup based on a determination that the entities are associated with respective first similarity values within a user-defined and/or predefined range with respect to each other. For example, a first entity of class 222d may be associated with a first similarity value of 0.900 and a second entity of class 222d may be associated with a first similarity value of 0.901. In some embodiments, entities may automatically be grouped if they are associated with respective first similarity values within 0.000 0.002, 0.005, 0.01, 0.015, or 0.02 with respect to each other. Thus, the first entity and the second entity, which are associated with respective first similarity values within 0.001 with respect to each other, may automatically be grouped into a first subgroup. While described with respect to one subgroup that comprises two entities, class 222d may comprise any number of subgroups, each of which may comprise any number of entities within any user-defined and/or pre-defined range with respect to each other.

In some embodiments, a respective second similarity value may be calculated for each entity grouped into class 222d in a series of steps. In some embodiments, a first step may comprise calculating a respective second similarity value for each entity in a subgroup. This may be important at least to determine which entity of the subgroup is associated with the highest second similarity value (e.g., by comparing and/or ranking entities of the subgroup, as discussed with respect to class 222c). In some embodiments, the respective second similarity values for a plurality of entities within a subgroup may be the same (within an error); in these embodiments, a first entity (e.g., by order) of the plurality of entities may be determined to be associated with the higher second similarity value. In some embodiments, the second similarity value for an entity in a subgroup may be calculated by a similarity value technique that is capable of more precisely determining the second similarity value (e.g., to more easily identify small differences between entities of the subgroup). In some embodiments, a second step may similarly comprise calculating a respective second similarity value for each entity in each other subgroup to determine, for each subgroup, which entity is associated with the highest second similarity value. In some embodiments, the first step and the second step may occur simultaneously, at least to reduce computation time and/or resources required. In some embodiments, a third step may comprise comparing (1) the entities determined to be associated with the highest second similarity value for each subgroup and/or (2) any entity of class 222d not included in a subgroup. In some embodiments, the corresponding entity of the second data set grouped into class 222d determined to result in the highest second similarity value when compared to the first entity of the first data set may be selected to enrich the first entity of the first data set. In some embodiments, the first entity of the first data set may be enriched in the same manner described with respect to block 224b.

In some embodiments, if the first entity of the first data set is classified into class 222e, indicating (1) that medium and/or strong matches have been detected between the first entity and entities of the second data set, and (2) that each match is sufficiently distinct from other matches, a respective second similarity value may be calculated for each entity of the second data set grouped into class 222e. In some embodiments, the respective second similarity values may be compared and/or ranked. In some embodiments, the corresponding entity of the second data set grouped into class 222e that produces the highest second similarity value when compared to the first entity of the first data set (e.g., the corresponding entity ranked as the best match) may be selected to enrich the first entity of the first data set. In some embodiments, the first entity of the first data set may be enriched in the same manner described with respect to block 224b.

In some embodiments, the first entity matching technique may be applied in an iterative manner to determine all entities of the second data set that correspond to each entity of the first data set. In some embodiments, the enriched data set is generated only after all iterations are complete (e.g., to make sure that the enriched data set is filled with the most accurate data). Thus, for each entity of the first data set, the steps described with respect to blocks 216, 218, 220, 222, and/or 224 may be performed.

In some embodiments, if more than a user-defined and/or predefined number and/or percentage of entities of the first data set are classified into class 222a, indicating that no match has been detected, a second entity matching technique may be applied. In some embodiments, the second entity matching technique may be a different string similarity technique than that described with respect to applying the first entity matching technique. Applying the additional entity matching technique may be advantageous at least to reduce the number and/or percentage of entities of the first data set which cannot be enriched. In some embodiments, the second entity matching technique may be applied in the same manner described with respect to the first entity matching technique (e.g., by following the steps described with respect to block 216, 218, 220, 222, 224, and/or 226).

Turning back to FIG. 2A, at block 210, in some embodiments, a statistical matching technique may generate one or more predicted data elements for one or more entities included in the first data set. The one or more predicted data elements may be based at least in part on one or more data elements associated with one or more entities in the second data set that are determined to be similar (e.g., via a calculated first probability value) to the first entity included in the first data set. In some embodiments, based at least in part on the first probability value, one or more predicted data elements may be generated for storage in the enriched data set by extrapolating from one or more data elements associated with one or more similar entities. The one or more predicted data elements may pertain to information that is otherwise not commonly available.

FIG. 2C depicts a flowchart of a method for applying a statistical matching technique, according to some embodiments.

At block 230, in some embodiments, applying the statistical matching technique may comprise calculating a first probability value by comparing the first entity of the first data set with a second corresponding entity of the second data set. In some embodiments, the first probability value may be indicative of an estimated likelihood that the second corresponding entity is similar to the first entity. In some embodiments, the first entity and the second corresponding entity may be determined to be similar if the calculated first probability value exceeds a predefined and/or user-defined minimum probability threshold.

In some embodiments, the first probability value may be calculated based at least in part by identifying one or more similar data elements associated with the first entity and the second corresponding entity. In some embodiments, identifying one or more similar data elements associated with the first entity and the second corresponding entity may comprise (1) determining one or more common features (e.g., firmographics) associated with both the first entity and the second corresponding entity; and (2) determining, for the one or more common features, how similar data elements associated with the second corresponding entity are to data elements associated with the first entity. In some embodiments, the greater the number of features in common between the first entity and the second corresponding entity, and the more similar the data elements associated with those common features, the higher the first probability value. Thus, the first probability value may be correlated to a quantity and a quality of similarities between the first entity and the second corresponding entity.

In some embodiments, determining one or more common features associated with both the first entity and the second corresponding entity may comprise determining a string similarity between feature headers. In some embodiments, the string similarity may be calculated by applying any string similarity technique (e.g., any string similarity technique described with respect to block 216). In some embodiments, the one or more features may comprise (1); business identifiers such as industry, annual revenue, and/or employee count; and/or (2) personal identifiers such as age, income, and/or marital status. Thus, it may be determined that the first entity and the second corresponding entity have a feature in common if each is associated with annual revenue, for example.

In some embodiments, determining, for the one or more common features, how similar data elements associated with the second corresponding entity are to data elements associated with the first entity may comprise determining a numerical similarity between data elements. In some embodiments, data elements may be determined to be similar if they are within a predefined and/or user-defined range with respect to each other (e.g., if data elements for annual revenue are within $100,000, $1 million, $10 million, or $100 million with respect to each other). Thus, it may be determined that the first entity and the second corresponding entity have a similar data element if each is associated with a similar annual revenue, for example.

In one exemplary embodiment, the statistical matching technique may be applied between the first data set and the second data set to generate a number of users predicted data element and a number of advertisements per user predicted data element for a first entity, Facebook, of a first data set. The predicted data elements may be based on one or more data elements corresponding to user data and advertisement data for a second corresponding entity. Facebook may be associated with firmographics including one or more of: company name data, industry data, annual revenue data, and/or employee count data. Based on the firmographic data, it may be gleaned that Facebook is a social media software company (as indicated by associated industry data), has annual revenue in excess of $50 billion (as indicated by annual revenue data), and has more than 50,000 employees (as indicated by employee count data). Similarly, the second corresponding entity may be associated with firmographics including one or more of: industry data, annual revenue data, employee count data, user data, and/or advertisement data. Based on the firmographic data, it may be gleaned that the second corresponding entity is a social media company (as indicated by associated industry data), has revenue in excess of $50 billion (as indicated by associated annual revenue data), has more than 50,000 employees (as indicated by associated employee count data), is associated with a number of users (e.g., 100, 1,000, 10,000, 100,000, 1,000,000, 10,000,000, 100,000,000, or 1,000,000,000 users, as indicated by associated user data), and is associated with a number of advertisements per month per user (e.g., 1, 10, 100, 1,000, or 10,000 advertisements per month per user, as indicated by associated advertisement data). Thus, based on a determination that the first entity and the second corresponding entity have common features (e.g., industry data, annual revenue data, and employee count data) and that for the common features, data elements associated with the second corresponding entity are similar to data elements associated with the first entity, one or more predicted elements (e.g., a number of users predicted data element and a number of advertisements per user predicted data element) for Facebook may be generated based on the second corresponding entity of the second data set.

At block 232, in some embodiments, a first confidence value may be generated based at least in part on the first probability value. In some embodiments, the first confidence value may be indicative of a confidence that the first entity is likely to share a characteristic of the second corresponding entity. In some embodiments, the first confidence value may be a function of the first probability value. In some embodiments, the first confidence value may be directly proportional to the first probability value, such that the higher the first probability value, the higher the confidence value.

In some embodiments, a determination of how likely the first entity is to share a characteristic of the second corresponding entity may be based at least in part on the first confidence value. In some embodiments, the confidence value may be compared to a user-defined and/or predefined minimum confidence threshold. Comparing the confidence value to a minimum confidence threshold may be advantageous at least to determine whether one or more predicted data elements may be generated based one or more data elements associated with the similar entity.

At block 234, in some embodiments, the second corresponding entity may be classified into one of a plurality of classes. In some embodiments, the second corresponding entity may be classified into one of the plurality of classes according to predefined respective ranges of probability values and/or confidence values for each of the plurality of classes. In some embodiments, the classes may comprise one or more of the following: a class indicating that the first entity is not very similar to and/or not very likely to share a characteristic of the second corresponding entity (e.g., class 234a of FIG. 2C); a class indicating that the first entity is somewhat similar to and/or somewhat likely to share a characteristic of the second corresponding entity (e.g., class 234b of FIG. 2C); and a class indicating that the first entity is very similar to and/or very likely to share a characteristic of the second corresponding entity (e.g., class 234c of FIG. 2C).

At block 236, in some embodiments, the statistical matching technique may be applied in an iterative manner to determine a set of corresponding entities of the second data set that are similar to the first entity of the first data set. Thus, applying the statistical matching technique may comprise calculating a respective first probability value and a respective first confidence value by comparing each of a set of entities of the second data set to the first entity of the first data set. In some embodiments, each entity of the set of entities may be classified in a similar manner to that described with respect to block 234. Thus, in some embodiments, the statistical matching technique may be applied to calculate a set of first probability values and/or a set of first confidence values, and to classify a set of corresponding entities of the second data set.

In some embodiments, the statistical matching technique may be applied in an iterative manner to compare each entity of the second data set to the first entity of the first data set. This may be advantageous at least to ensure that the most similar entities of the second data set may be used to generate the one or more predicted data elements. In some embodiments, the statistical matching technique may be applied only until a total confidence value, calculated by summing respective first confidence values, exceeds the confidence threshold described with respect to block 232. This may be advantageous at least to reduce computing time and/or resources required.

At block 238, in some embodiments, after calculating and classifying the set of first probability values and/or the set of first confidence values for the first entity of the first data set, the first entity may be classified into one of a plurality of classes. In some embodiments, the classes may comprise one or more of the following: a class indicating that the first entity is not very similar to and/or not very likely to share a characteristic of the set of corresponding entities (e.g., class 238a of FIG. 2C); a class indicating that the first entity is somewhat similar to and/or somewhat likely to share a characteristic of the set of corresponding entities (e.g., class 238b of FIG. 2C); and a class indicating that the first entity is very similar to and/or very likely to share a characteristic of the set of corresponding entities (e.g., class 238c of FIG. 2C). In some embodiments, the first entity may be classified into a class based on a quantity and/or a quality of respective first probability values included in the set of first probability values and/or a quantity and/or a quality of respective first confidence values included in the set of first confidence values. For example, the first entity may be classified into class 238a if a small quantity and/or a low percentage of entities of the second data set are determined to be similar to the first entity and/or if a large quantity and/or a high percentage of entities of the second data set that are determined to be similar to the first entity are classified into class 234a (indicating that they are not very similar to and/or not very likely to share a characteristic of the first entity). In some embodiments, upon classifying the first entity into one of the plurality of classes, one or more entities of the second data set determined to be similar to the first entity may be grouped into the class. Thus, each class may include an indication of the one or more entities of the second data set upon which classification of the first entity is based.

At block 240, in some embodiments, one or more predicted data elements for the first entity of the first data set may be generated based at least in part on one or more data elements associated with one or more entities of the second data set determined to be similar to the first entity. In some embodiments, one, some, or each of the predicted data elements may be generated by extrapolating from one or more data elements associated with the one or more entities of the second data set determined to be similar to the first entity. For example, in some embodiments, one, some, or each of the predicted data elements may be generated based at least in part on one or more statistical measures (e.g., a weighted average, a frequency, a mean, a median, and/or a mode) of the one or more data elements associated with the one or more entities of the second data set which were determined to be similar to the first entity.

In some embodiments, as described above, the one or more predicted data elements may be generated in accordance with a determination that the set of first confidence values exceed a minimum confidence threshold. In some embodiments, each of the one or more predicted data elements may represent a probability value indicating an estimated likelihood that an entity has a predicted characteristic. In some embodiments, based at least in part on the classification of the first entity at block 238, the one or more predicted data elements may be generated based on a different quantity of entities of the first data set determined to be similar to the first entity. For example, if the first entity is classified into class 238c because many high first confidence values are included in the set of first confidence values, a predicted data element may be generated based on as few as one entity of the second data set (e.g., a "one-to-one" approach). Contrastingly, if the first entity is classified into class 238a because many low confidence values are included in the set of first confidence values, a predicted data element may be generated based on many entities of the second data set (e.g., a "one-to-many" approach).

In some embodiments, the statistical matching technique may be applied in an iterative manner to determine one or more entities of the second data set that correspond to each entity of the first data set. Thus, for each entity of the first data set, the steps described with respect to blocks 230, 232, 234, 236, 238, and/or 240 may be performed. Applying the statistical matching technique for all entities included in the first data set may be advantageous at least to generate as complete an enriched data set as possible.

Tables 1-5, below, illustrate an example application of applying the statistical matching technique, according to some embodiments.

As shown in Tables 1-3, below, upon receipt of a first data set including company information (see Table 1) and a second data set including customer information (see Table 2), a first probability value and/or a first confidence value may be calculated by comparing one or more data elements associated with a feature of the first entity of the first data set (e.g., an age data element associated with person x) with one or more data elements associated with a feature of one or more entities of the second data set (e.g., an age data element associated with survey respondent 1 and/or an age data element associated with survey respondent 2).

TABLE 1

Example first data set including company information.
The company information data set includes a column
("Person_id") indicating IDs of people, and one or
more columns ("Age, Income, Marital Status" not filled in)
representing data elements associated with the people.

| Person_id | Age, Income, Marital Status |
|---|---|
| x | |
| y | |
| z | |

TABLE 2

Example second data set including customer information. The customer
information data set includes a column ("Survey_respondent_id")
indicating customer IDs, and one or more columns
("Age, Income, Martial Status" and "Online_banking")
representing data elements associated with the customers.

| Survey_respondent_id | Age, Income, Marital Status | Online_banking |
|---|---|---|
| 1 | | 1 |
| 2 | | 1 |
| 3 | | 1 |
| 4 | | 0 |
| 5 | | 0 |

A first probability value and/or a first confidence value for each of one or more survey respondents of the customer information data set may be calculated. For example, calculated first probability values are shown in the "Distance" column of Table 3. Based at least in part on the first probability value and/or the first confidence value, each survey respondent of the customer information data set may be classified. For example, classifications are shown in the "Class" column of Table 3 (where class 1 corresponds to class 234c described above and class 2 corresponds to class 234b described above). A specific number of survey respondents included in the second data set may be selected to enrich person x of the company information data set, for example by comparing respective first confidence values to a confidence threshold, as discussed above. For example, as shown in Table 3, survey respondents 3, 4, and 5 of the second data set are similar to person x of the company information data set, with survey respondent 3 being the most similar to person x. Survey respondents 3, 4, and 5 may be selected, or only survey respondent 3 may be selected to enrich person x. The selection may occur automatically, or the selection may comprise a user selection (e.g., a selection made by a salesperson associated with requestor 102b of FIG. 1).

TABLE 3

Example indication of those survey respondents of the
customer information data set who are similar to person
x of the company information data set.

| Person_id | Survey_respondent_id | Distance | Class |
|---|---|---|---|
| x | 3 | 0.98 | 1 |
| | 4 | 0.97 | 1 |
| | 5 | 0.95 | 2 |

A predicted data element indicating a likelihood that person x banks online may be generated based on the online banking information associated with survey respondents 3, 4, and 5, each of whom was determined to be similar to person x. Table 4, below, shows the online banking data associated with survey respondents 3, 4, and 5 (copied from Table 2, above). As shown, whether a survey respondent banks online may be binary: a survey respondent may either bank online (indicated by a 1 in the column "Online_banking(Y)" and a 0 in the column "Online_banking(N)") or not bank online (indicated by a 0 in the column "Online_banking(Y)" and a 1 in the column "Online_banking(N)").

TABLE 4

Online baking information associated with survey respondents
determined to be similar to person x.

| Person_id | Survey_respondent_id | Online_banking(Y) | Online_banking(N) |
|---|---|---|---|
| x | 3 | 1 | 0 |
| | 4 | 0 | 1 |
| | 5 | 0 | 1 |

As shown in Table 5, the predicted data element for employee x may be that the employee is not likely to bank online (indicated by the 0 in the "Online_banking" column). The predicted data element may be determined by calculating a mean of the respective online banking data points associated with survey respondents 3, 4, and 5. The predicted data element may be determined by calculating a likelihood that person x will bank online (⅓), calculating a likelihood that person x will not bank online (⅔), and determining whether person x will bank online by selecting the higher likelihood (selecting that person x will not bank online). Thus, although the predicted data element for person x is that the person will not bank online, it is not certain that the person will not bank online. The probability that person x does not bank online is approximately only 66.7% (and the probability that person x banks online is approximately 33.3%).

TABLE 5

Example predicted data element generation for person x
of the company information data set.

| Person_id | Online_banking(Y) | Online_banking(N) | Online_banking |
|---|---|---|---|
| x | 1/3 | 2/3 | 0 |

In some embodiments, upon generating the enriched data set, the processing module may be configured to transmit the enriched data set to an analysis module (e.g., analysis module 116 of FIG. 1).

Turning back to FIG. 2A, at block 212, in some embodiments, the analysis module may generate one or more data insights and/or recommendations pertaining to the enriched data set. In some embodiments, the one or more data insights and/or recommendations may include a recommended price and/or a recommended volume. In some embodiments, the analysis may occur in real-time, such that (1) analysis may be catered to the context of a problem to be solved; and (2) a user of an automated data set enrichment and analysis system may be able to efficiently and effectively make decisions pertaining to the enriched data set. As discussed above, in some embodiments, one or more data insights and/or recommendations may be generated by applying one or more artificial intelligence models and/or one or more machine learning models to the enriched data set.

In some embodiments, applying the one or more artificial intelligence and/or machine learning models may comprise applying one or more segmentation techniques to the enriched data set. The segmentation technique may be based at least in part on a predicted data element generated by the statistical matching technique discussed above. For example, the first data set (comprising company data) may be segmented into one or more segments based on relevant features (e.g., customer buying behavior) included in the second data set. In some embodiments, the one or more segments may include one or more of: a segment for strategically important customers, a segment for new customers, a segment for potentially valuable customers, and a segment for disengaged customers. Thus, in some embodiments, the segmentation technique may uncover hidden relationships between data points representing customer characteristics (e.g., characteristics indicative of customer buying patterns).

In some embodiments, the segmentation technique may be customizable. For example, in some embodiments, the segmentation technique may be a clustering technique, and a user may be able to specify the number of segments and/or one or more data elements to input into the clustering technique. In some embodiments, once a segment has been populated, (1) the segment may then serve as a feature for further analysis (e.g., to analyze margin and/or discount variance); and/or (2) white space analysis may be performed (e.g., to understand a product buying pattern for customers in a particular segment and/or to identify opportunities to up-sell).

In some embodiments, a new entity added to the enriched data set may be added to a preexisting segment. In some embodiments, a new entity may be added to the preexisting segment based at least in part on a mathematical distance calculation of a similarity value between one or more identifying features of the new entity and one or more identifying features of preexisting entities included in the preexisting segment. In some embodiments, the similarity value may be calculated between one or more values associated with one or more identifying features of the new entity and one or more aggregate values associated with one or more identifying features of preexisting entities included in the preexisting segment. In some embodiments, the mathematical distance calculation may be any type of mathematical distance calculation (e.g., a Euclidean distance calculation, a Manhattan distance calculation, a Minkowski distance calculation, or a Hamming distance calculation). In some embodiments, the mathematical distance calculation may be a Euclidean distance calculation.

In some embodiments, applying the one or more artificial intelligence and/or machine learning models may comprise applying a filtering technique to the enriched data set. In some embodiments, applying the filtering technique may comprise automatically determining one or more similar characteristics among a subset of the entities included in the enriched data set. In some embodiments, the filtering technique may be applied to identify collaborative buying habits among a set of similar customers, such that one or more products may be recommended for a customer of the set of similar customers based at least in part on buying habits associated with one or more other customers of the set of similar customers. In some embodiments, the set of similar customers may be generated by comparing customers in the enriched data set and calculating a cosine similarity value between pairs of customers. Applying this filtering technique may be advantageous compared to content-based techniques which filter merely based on item features that are similar to an item a customer has bought.

In some embodiments, applying the one or more artificial intelligence and/or machine learning models may comprise applying one or more sensitivity analysis techniques. In some embodiments, a sensitivity analysis technique may be applied to determine sensitivity of the first entity of the enriched data set relative to variations in one or more variables. For example, the sensitivity analysis technique may be applied to determine the relationship between price and volume. In some embodiments, the sensitivity analysis technique may be based at least in part on a determination of which entities of the enriched data set are similar to the first entity. In some embodiments, the sensitivity analysis technique may similarly be applied for some or all other entities included in the first data set, at least to determine the sensitivity of more than one entity relative to variations in the one or more variables, and/or to determine the sensitivity of different entities relative to variations in different variables. In some embodiments, the similarity determination may be calculated by comparing corresponding identifying features to calculate a mathematical distance, as discussed above. In some embodiments, the one or more sensitivity analysis techniques may be trained on hundreds, thousands, or millions of data points, such that the best sensitivity analysis technique may be automatically selected.

In some embodiments, applying the one or more artificial intelligence and/or machine learning models may comprise applying one or more optimization analysis techniques. In some embodiments, an optimization analysis may optimize the one or more variables for which sensitivity was determined by a sensitivity analysis technique. For example, an optimization analysis technique may be configured to determine, for the same entities analyzed by the sensitivity analysis technique, an optimal (or "target") price and/or volume for a product. In some embodiments, additionally or alternatively, the optimization technique may be configured to determine a "best-in-class" (e.g., a higher price than the target price) and/or a "floor" (e.g., a lower price than the target price) price and/or volume for a produce.

In some embodiments, applying the one or more artificial intelligence and/or machine learning models may comprise evaluating the one or more artificial intelligence and/or machine learning models. In some embodiments, model evaluation may comprise identifying which data elements associated with an entity of the enriched data set drive variance for that entity. For example, the models may be evaluated to identify which variables drive a significant portion of margin and/or discount variance. In some embodiments, evaluation of the models may be based at least in part on model performance relative to one or more statistical metrics. In some embodiments, calculation of the one or more statistical metrics may be advantageous at least to ensure that the models are not overfitted or underfitted. In some embodiments, the one or more statistical metrics for a model may be accuracy, precision, recall, F-score, R-squared score, log-log cross entropy, root-mean squared error, mean absolute error, any combination thereof, and/or the like. The one or more statistical metrics may be predefined (e.g., such that every model is automatically evaluated according to the same set of metrics), or the one or more statistical metrics may be selected based on a particular application of the analysis module (e.g., based on the context of generating data insights and/or recommendations for a particular enriched data set). In some embodiments, the models may not be evaluated each time they are run; rather, the models may be evaluated periodically (e.g., after every 10 times, 100 times, or 1,000 times the models are run, or after every 10 days, 100 days, or 1,000 days).

In some embodiments, upon evaluation of the models, only a subset of the models (e.g., the best-performing model relative to the statistical metrics) may be selected to generate one or more data insights and/or recommendations pertaining to the enriched data set. In some embodiments, a model may only be selected if the accuracy of the model exceeds a threshold. The threshold may be predefined or user-defined. Moreover, the threshold may be changed over time (at least because as model usage increases, its accuracy may also increase). In some embodiments, the analysis module may be configured to transmit the generated data insights and/or recommendations to a visualization module (e.g., visualization module 130 of FIG. 1).

At block 214, in some embodiments, the visualization module may receive the data insights and/or recommendations and generate and display a visualization of the data insights and/or recommendations. As discussed above, the visualization module may interface with one or more connectors (e.g., APIs 134 of FIG. 1) to generate and display the visualization. Moreover, as discussed above, the visualization may be displayed on the platform used to request initiation of data set enrichment and analysis (e.g., a CRM platform and/or a CPQ platform, such as Salesforce). Thus, a user (e.g., a salesperson associated with requestor 102b of FIG. 1) may be able to simultaneously view the criteria used to initiate data set enrichment and analysis (e.g., quote information) and the outcome of the data set enrichment and analysis (e.g., price and/or volume recommendations) in the same user interface.

FIG. 3A shows an exemplary graphical user interface 300 for visualizing data insights and/or recommendations, according to some embodiments. In some embodiments, interface 300 may include region 301 in which a user may select a user affordance (e.g., tab 301a) to display the outcome of the data set enrichment and analysis. The user affordance may be selected from a plurality of user affordances.

In some embodiments, interface 300 may include region 302 in which the criteria used to initiate data set enrichment and analysis (e.g., quote information) may be specified. Region 302 may include a first data field (e.g., data field 304a), one or more descriptors indicating the subject of the first data field (e.g., descriptor 306a), and/or one or more user affordances (e.g., user affordance 308a) for specifying the data included in the first data field. In some embodiments, a user affordance may be displayed within the first data field to alert a user that the user affordance is associated with the first data field. In some embodiments, upon selection of the user affordance (e.g., via a mouse click on or a mouse hover over the user affordance), a menu (e.g., a drop-down menu) comprising one or more pre-defined and/or user-defined data entries for the first data field may be displayed. In some embodiments, one or more of the entries listed for the first data field may be selected.

In some embodiments, region 302 may include a plurality of data fields, some or all of which may be associated with a corresponding descriptor and/or user affordance. In some embodiments, data may be entered into the plurality of data fields simultaneously, or in some embodiments, data may be entered into each of the plurality of data fields individually. As shown in FIG. 3A, region 302 may include data field 304c, corresponding descriptor 306c, and corresponding user affordance 308c. Moreover, as shown in FIG. 3A, region 302 may include data field 304e which is not associated with a corresponding user affordance. In some embodiments, a data field not associated with a corresponding user affordance may be selected (e.g., via a mouse-click on or a mouse hover over the data field), and a text string (e.g., any combination of alphanumeric characters) may subsequently be entered into the data field (e.g., via typing in the data entry using a keyboard).

In some embodiments, region 302 may include a user affordance (e.g., a button) for initiating data set enrichment and analysis. One, some, or all of the data fields may serve as parameters for the data set enrichment and analysis.

In some embodiments, interface 300 may include region 312 in which current pricing information may be displayed. In some embodiments, region 312 may include information (e.g., a descriptor and/or data) pertaining to one or more of: a list price with no discount, a price after subtracting a partner discount, a price after subtracting a volume discount, and an invoice revenue. In some embodiments, the data included in region 312 may include a percent discount and/or a dollar price for one, some or all prices listed. The information may be arranged in a table to organize for ease of viewing. In some embodiments, data associated with the invoice revenue (e.g., the data included in region 314) may be easily compared to data associated with the data set enrichment and analysis (e.g., the data included in region 316, which may be adjacent to region 312).

In some embodiments, the data included in region 316 may include data insights and/or recommendations generated by analyzing the enriched data set, as discussed throughout the disclosure. For example, as shown in FIG. 3A, region 316 may include data pertaining to the "target" price, the "best-in-class" price, and the "floor" price, which were discussed above with respect to the optimization analysis technique. The data related to the different pricing options may be displayed adjacent to each other for ease of visualization and/or comparison. Thus, a user may be able to quickly determine optimal pricing strategies for products and services. This optimal strategy determination may advantageously enable deal conversion while improving revenue margins.

Thus, the parameters used to generate a quote, current price information for the quote, and recommended price information for the quote may be simultaneously displayed. This simultaneous display may advantageously enable a user (e.g., a sales representative) to easily, quickly discern the differences between current price options and recommended price options. Moreover, the simultaneous display may advantageously enable a user to modify one or more of the parameters used to generate the quote, and visualize in real-time how the modification affects price options. The user may enter different discount structures (e.g., based at least in part on a customer segment and/or a product), and quickly assess if the discount is in accordance with the optimal recommendations.

In some embodiments, as shown, the information included in regions 312 and 316 are organized into data tables. In some embodiments, the data may be automatically populated into the data tables shown upon a user selection of user affordance 310. In some embodiments, the data included in the data tables may not be edited, or in some embodiments, one or more of the data fields included in the data tables may be edited. Moreover, interface 300 may include an editable title (e.g., in region 318) in which a descriptor of the information shown in one or more regions (e.g., region 312 and region 316) of the interface may be displayed.

In some embodiments, interface 300 may include region 320 in which approval information pertaining to the generated quote may be displayed. For example, as shown in FIG. 3A, the approval information may comprise the position and/or level associated with one or more supervisors who have the authority to approve the generated quote. Thus, a salesperson using the interface may quickly glean whom to contact to achieve approval and close a deal.

In some embodiments, interface 300 may include region 322 in which one or more user affordances (e.g., buttons) may be selected to modify the interface displayed. For example, user affordance 324 may be selected to edit the interface shown (e.g., to move one or more regions with respect to another, to edit a descriptor, to edit a data field, and/or to delete or add information). Another user affordance may be selected to generate and display another, related interface, for example FIG. 3B.

Figure 3B:
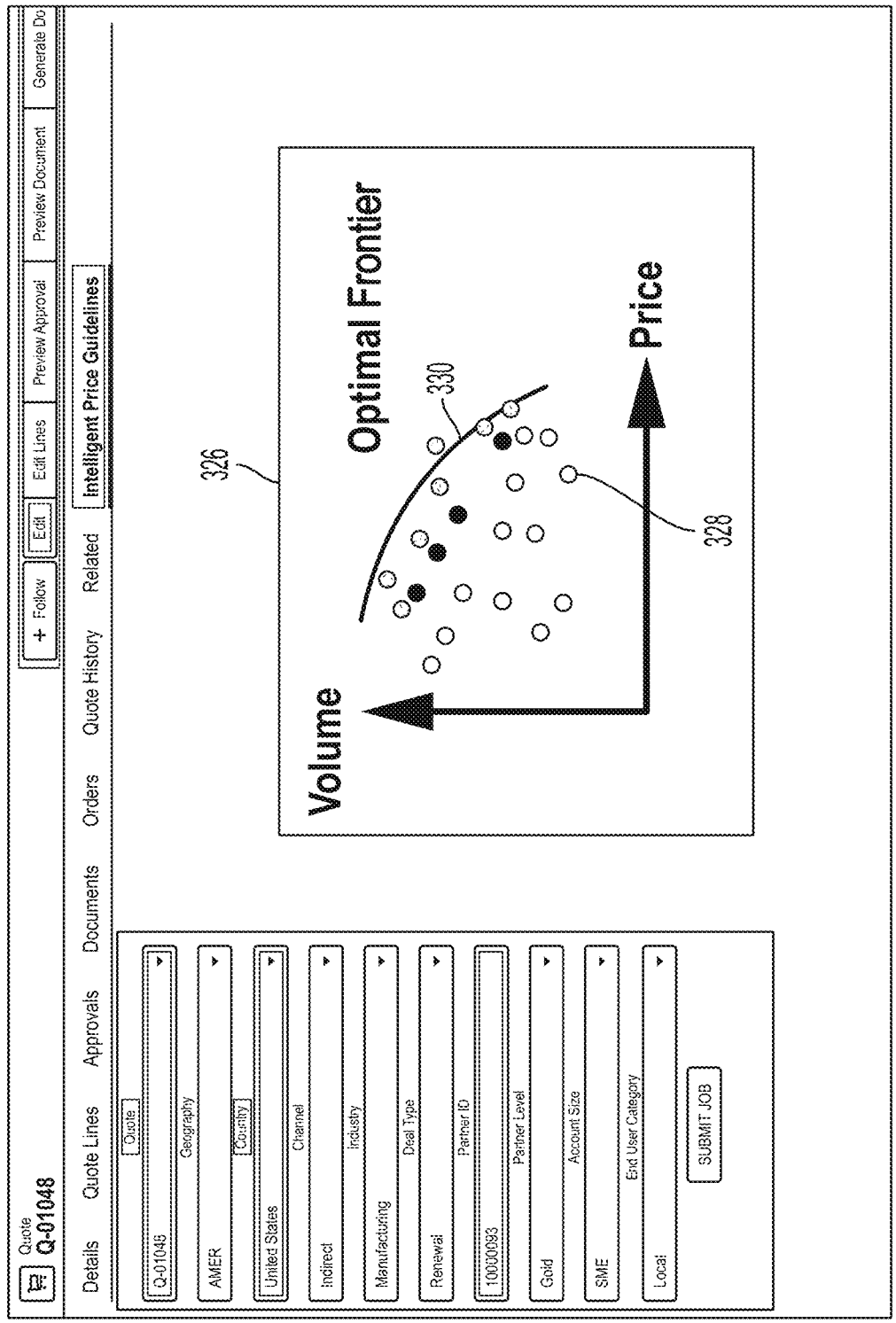

FIG. 3B shows another exemplary graphical user interface for visualizing data insights and/or recommendations, according to some embodiments. In some embodiments, FIG. 3B may include region 302 of FIG. 3A, in which the criteria used to initiate data set enrichment and analysis (e.g., quote information) may be specified. Further, in some embodiments, FIG. 3B may include region 326 in which a visualization of one or more data analyses is displayed. For example, as shown in FIG. 3B, region 326 may include a graphical visualization of the sensitivity analysis and the optimization analysis described above. Each data point (e.g., circle 328) included in the graph may represent an entity of the enriched data set, such that the entity's sensitivity to variations in price and/or volume may be quickly and easily analyzed. Moreover, an "optimal frontier" (e.g., arc 330) may be drawn on the graph to delineate the optimal price/volume ratios, and to clearly indicate those entities which are above the curve (e.g., those entities for which the price is above the "target" price) and those entities which are below the curve (e.g., those entities for which the price is below the "target" price).

In some embodiments, displaying a visualization of data insights gleaned from an analysis, rather than the summary list of recommendations described with respect to FIG. 3A, may be advantageous at least to (1) enable a user to easily understand how the recommendations were generated; and/or (2) quickly visualize how a modification to one or more parameters included in region 302 may affect data analysis and recommendation generation.

Although discussed and shown separately, the visualization of data insights gleaned from an analysis and the recommendations produced from that analysis may be simultaneously displayed on a user interface. Simultaneously displaying the data insights and the recommendations pertaining to the same analysis may be advantageous at least to enable a user to view both the high-level impact of the criteria used to initiate data set enrichment and analysis (e.g., to scan the price recommendations) and the details used to generate the recommendations.

Moreover, in some embodiments, the visualization(s) of the data insights and/or recommendations may be displayed on one device, or may be simultaneously displayed on a plurality of devices. For example, displaying the visualization(s) on a plurality of devices may advantageously enable a team of salespeople to each view the data insights and/or recommendations during a meeting.

Figure 4:
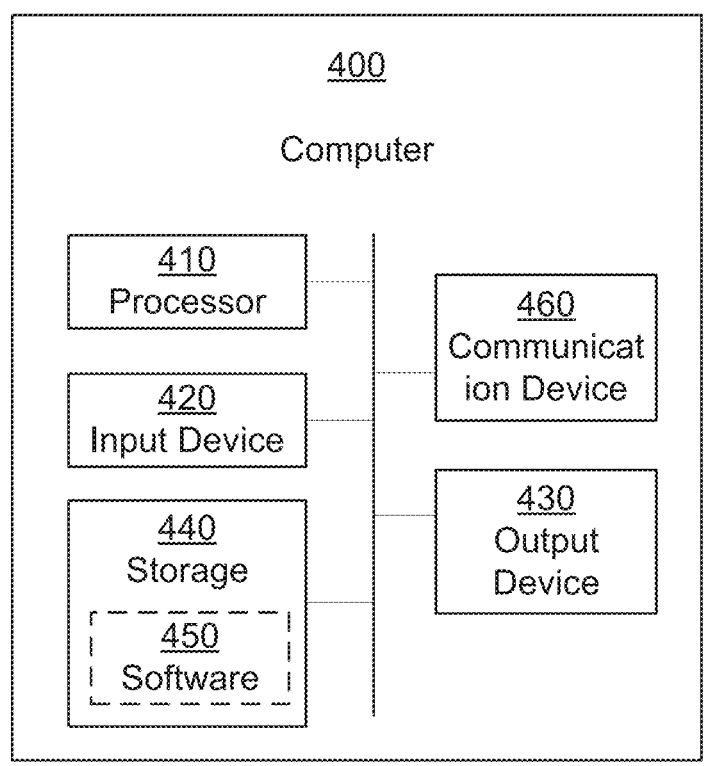
FIG. 4 illustrates a computing device, according to some embodiments.

FIG. 4 illustrates an example of a computer, according to some embodiments. Computer 400 can be a component of an automated data set enrichment and analysis system according to the systems and methods described above, such as system 100 of FIG. 1, or can include the entire system itself. In some embodiments, computer 400 may execute a method for ingesting data sets, generating an enriched data set by applying one or more entity matching techniques and/or one or more statistical matching techniques to the ingested data sets, and generating and/or displaying one or more data insights pertaining to the enriched data set.

Computer 400 can be a host computer connected to a network. Computer 400 can be a client computer or a server. As shown in FIG. 4, computer 400 can be any suitable type of microprocessor-based device, such as a personal computer, workstation, server, or handheld computing device, such as a phone or tablet. The computer can include, for example, one or more of processor 410, input device 420, output device 430, storage 440, and communication device 460. Input device 420 and output device 430 can correspond to those described above and can either be connectable or integrated with the computer.

Input device 420 can be any suitable device that provides input, such as a touch screen or monitor, keyboard, mouse, or voice-recognition device. Output device 430 can be any suitable device that provides an output, such as a touch screen, monitor, printer, disk drive, or speaker.

Storage 440 can be any suitable device that provides storage, such as an electrical, magnetic, or optical memory, including a random access memory (RAM), cache, hard drive, CD-ROM drive, tape drive, or removable storage disk. Communication device 460 can include any suitable device capable of transmitting and receiving signals over a network, such as a network interface chip or card. The components of the computer can be connected in any suitable manner, such as via a physical bus or wirelessly. Storage 440 can be a non-transitory computer-readable storage medium comprising one or more programs, which, when executed by one or more processors, such as processor 410, cause the one or more processors to execute methods described herein.

Software 450, which can be stored in storage 440 and executed by processor 410, can include, for example, the programming that embodies the functionality of the present disclosure (e.g., as embodied in the systems, computers, servers, and/or devices as described above). In some embodiments, software 450 can include a combination of servers such as application servers and database servers.

Software 450 can also be stored and/or transported within any computer-readable storage medium for use by or in connection with an instruction execution system, apparatus, or device, such as those described above, that can fetch and execute instructions associated with the software from the instruction execution system, apparatus, or device. In the context of this disclosure, a computer-readable storage medium can be any medium, such as storage 440, that can contain or store programming for use by or in connection with an instruction execution system, apparatus, or device.

Software 450 can also be propagated within any transport medium for use by or in connection with an instruction execution system, apparatus, or device, such as those described above, that can fetch and execute instructions associated with the software from the instruction execution system, apparatus, or device. In the context of this disclosure, a transport medium can be any medium that can communicate, propagate, or transport programming for use by or in connection with an instruction execution system, apparatus, or device. The transport-readable medium can include but is not limited to, an electronic, magnetic, optical, electromagnetic, or infrared wired or wireless propagation medium.

Computer 400 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Computer 400 can implement any operating system suitable for operating on the network. Software 450 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

Unless defined otherwise, all terms of art, notations and other technical and scientific terms or terminology used herein are intended to have the same meaning as is commonly understood by one of ordinary skill in the art to which the claimed subject matter pertains. In some cases, terms with commonly understood meanings are defined herein for clarity and/or for ready reference, and the inclusion of such definitions herein should not necessarily be construed to represent a substantial difference over what is generally understood in the art.

As used herein, the singular forms "a," "an," and "the" are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

This application discloses several numerical ranges in the text and figures. The numerical ranges disclosed inherently support any range or value within the disclosed numerical ranges, including the endpoints, even though a precise range limitation is not stated verbatim in the specification because this disclosure can be practiced throughout the disclosed numerical ranges.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

The invention claimed is:

1. A system for ingesting and enriching data regarding a plurality of entities, the system comprising one or more processors configured to cause the system to: receive a first data set from a first data source, the first data set comprising information regarding a first set of entities; receive a second data set from a second data source, the second data set comprising information regarding a second set of entities; process the first data set to generate a processed data set, wherein processing the first data set to generate a processed data set comprises, for a first entity in the first set of entities: applying a first entity matching technique to the first data set to associate one or more data elements in the first data set with one or more corresponding elements in the second data set in accordance with a determination that the one or more data elements in the first data set and the one or more data elements in the second data set are commonly associated with the first entity; determining that a number of entities in the first data set that are classified into a first match-type classification indicating zero weak, moderate, or strong similarity-value classifications exceeds a threshold number of entities, wherein the similarity-value classifications are based on applying one or more similarity value thresholds to a respective calculated similarity value, and wherein the respective calculated similarity values are determined by comparing the first entity to a respective entity in the second data set; applying a second entity-matching technique, wherein the second entity-matching technique is applied in response to the determination that the number of entities exceeds the threshold number of entities; and applying a statistical matching technique to the first data set to generate a predicted data element for the first entity of the first set of entities, wherein the predicted data element is based at least in part on one or more data elements associated with one or more entities in the second set of entities that are determined to be similar to the first entity; and store the processed data set in a database.

2. The system of claim 1, wherein applying the first entity matching technique comprises: comparing the first entity to each of the entities in the second data set to calculate, for each comparison, a respective similarity value; based at least in part on the plurality of calculated similarity values, selecting one of a plurality of data processing techniques to apply to the first entity; and generating the processed data set in accordance with the selected data processing technique.

3. The system of claim 2, wherein selecting the data processing technique comprises: classifying each of the plurality of calculated similarity values into a respective similarity-value classification of a plurality of predefined similarity-value classifications, wherein each of the similarity-value classifications are based on applying one or more similarity value thresholds to the respective calculated similarity value;
  classifying the first entity into one of a plurality of match-type classifications based on the plurality of the similarity-value classifications for each of the plurality of calculated similarity values for the first entity; and selecting the data processing technique based on the identity of the match-type classification into which the first entity is classified.

4. The system of claim 3, wherein the plurality of similarity-value classifications include: a first similarity-value classification indicating no similarity between entities; a second similarity-value classification indicating weak similarity between entities; a third similarity-value classification indicating moderate similarity between entities; and a fourth similarity-value classification indicating strong similarity between entities.

5. The system of claim 4, wherein the plurality of match-type classifications include: the first match-type classification indicating zero weak, moderate, or strong similarity-value classifications; a second match-type classification indicating exactly one weak, moderate, or strong similarity-value classification; a third match-type classification indicating a plurality of weak similarity-value classifications with no moderate or strong similarity-value classifications; and one or more fourth match-type classifications indicating one or more moderate or strong similarity-value classifications.

6. The system of claim 2, wherein the plurality of data processing techniques include: a first data processing technique comprising not enriching the first entity with any data elements associated from any entity from the second data set; a second data processing technique comprising enriching the first entity with one or more data elements associated with a selected matching entity from the second data set; and a third data processing technique comprising calculating a second similarity value used to select a matching entity from the second data set and enriching the first entity with one or more data elements associated with the selected matching entity.

7. The system of claim 2, wherein calculating respective similarity values comprises determining respective Levenshtein distances.

8. The system of claim 2, wherein calculating respective similarity values comprises applying one or more deep learning models.

9. The system of claim 8, wherein applying the one or more deep learning models comprises applying one or more user-defined weights.

10. The system of claim 2, wherein calculating respective similarity values comprises comparing a string descriptor including one or more of the following: a user name, a user address, a user occupation, an organization name, an organization address, an organization revenue, and an organization headcount.

11. The system of claim 1, wherein applying the statistical matching technique comprises, for the first entity: comparing the first entity to each of the entities in the second data set to calculate, for each comparison, a respective probability value and a respective confidence value; and generating one or more predicted data elements for the first entity for storage in the enriched data, wherein the one or more predicted data elements are based at least in part on corresponding data elements from one or more entities in the second data set, and wherein a manner of generating the predicted data element is selected based at least in part on one or both of the calculated probability values and the calculated confidence values.

12. The system of claim 11, wherein selecting the data processing technique comprises: classifying each of the plurality of statistical-matching technique comparisons of the first entity to a corresponding entity in the second set into a respective statistical-matching- comparison classification of a plurality of predefined statistical-matching-comparison classifications, wherein the classifying into statistical-matching-comparison classifications is based at least in part on one or both of the calculated probability value and the calculated confidence value for each respective statistical-matching comparison; classifying the first entity into one of a plurality of similarity-type classifications based on the plurality of the statistical-matching-comparison classifications for each of the plurality of statistical-matching comparisons for the first entity; and selecting the manner of generating the predicted data element based on the identity of the similarity-type classification into which the first entity is classified.

13. The method of claim 12, wherein the plurality of statistical-matching-comparison classifications include: a first statistical-matching classification indicating low similarity for the pair of compared entities; a second statistical-matching classification indicating moderate similarity for the pair of compared entities; and a third statistical-matching classification indicating high similarity for the pair of compared entities.

14. The method of claim 13, wherein the plurality of match-type classifications include: a first similarity-type classification indicating low similarity for the first entity to the set of entities in the second data set; a second similarity-type classification indicating moderate similarity for the first entity to the set of entities in the second data set; and a third similarity-type classification indicating a high similarity for the first entity to the set of entities in the second data set.

15. The system of claim 11, wherein generating the one or more predicted data elements for storage in the enriched data set comprises extrapolating from multiple entities in the second data set.

16. The system of claim 15, wherein generating the one or more predicted data elements comprises calculating a mean or mode value of data element values for the multiple entities in the second data set.

17. The system of claim 11, wherein the one or more predicted data elements represent a probability value indicating an estimated likelihood that the first entity has a predicted characteristic.

18. The system of claim 1, wherein the first data source is an internal database of a company, and wherein the first data set comprises company data.

19. The system of claim 1, wherein the second data source is an external database comprising customer data pertaining to one or more customer surveys.

20. The system of claim 1, wherein processing the first data set to generate the processed data set is performed in real-time such that the processed data set is modified dynamically as the first data set and the second data set are modified.

21. The system of claim 1, wherein the one or more processors are configured to cause the system to apply one or more artificial intelligence or machine learning models to the processed data set to generate one or more data insights.

22. The system of claim 21, wherein applying the one or more artificial intelligence or machine learning models comprises applying one or more segmentation techniques to the processed data set, wherein the segmentation is based at least in part on a predicted data element generated by the statistical matching technique.

23. The system of claim 22, wherein the one or more processors are configured to add a new entity added to the processed data set by adding the new entity to a preexisting segment based at least in part on a Euclidian distance calculation of a difference between one or more values associated with the new entity and one or more aggregate values associated with preexisting entities included in the preexisting segment.

24. The system of claim 21, wherein applying the one or more artificial intelligence or machine learning models comprises applying one or more filtering techniques to automatically determine one or more similar characteristics among a subset of the entities included in the processed data set.

25. The system of claim 21, wherein applying the one or more artificial intelligence or machine learning models comprises applying one or more sensitivity analyses to determine sensitivity of the first entity relative to variations in one or more variables, wherein the sensitivity analysis is based at least in part on a determination of which entities of the processed data set are similar to the first entity.

26. The system of claim 25, wherein applying the one or more artificial intelligence or machine learning models further comprises applying one or more optimization analyses, wherein the optimization analysis optimizes the one or more variables for which sensitivity was determined by the sensitivity analysis.

27. The system of claim 21, wherein the one or more processors are configured to cause the system to: rank a plurality of artificial intelligence or machine learning models, wherein ranking the models is based at least in part on model performance based on the processed data set relative to one or more predefined statistical metrics; and select the best-performing model to generate the one or more data insights.

28. A method for ingesting and enriching data regarding a plurality of entities, the method performed at a system comprising one or more processors, wherein the method comprises: receiving a first data set from a first data source, the first data set comprising information regarding a first set of entities; receiving a second data set from a second data source, the second data set comprising information regarding a second set of entities; processing the first data set to generate a processed data set, wherein processing the first data set to generate a processed data set comprises, for a first entity in the first set of entities: applying a first entity matching technique to the first data set to associate one or more data elements in the first data set with one or more corresponding elements in the second data set in accordance with a determination that the one or more data elements in the first data set and the one or more data elements in the second data set are commonly associated with the first entity; determining that a number of entities in the first data set that are classified into a first match-type classification indicating zero weak, moderate, or strong similarity-value classifications exceeds a threshold number of entities, wherein the similarity-value classifications are based on applying one or more similarity value thresholds to a respective calculated similarity value, and wherein the respective calculated similarity values are determined by comparing the first entity to a respective entity in the second data set applying a second entity-matching technique, wherein the second entity-matching technique is applied in response to the determination that the number of entities exceeds the threshold number of entities; and applying a statistical matching technique to the first data set to generate a predicted data element for the first entity of the first set of entities, wherein the predicted data element is based at least in part on one or more data elements associated with one or more entities in the second set of entities that are determined to be similar to the first entity; and storing the processed data set in a database.

29. A non-transitory computer-readable storage medium for ingesting and enriching data regarding a plurality of entities, the non-transitory computer-readable storage medium storing instructions configured to be executed by one or more processors of a system, wherein execution of the instructions by the one or more processors causes the system to: receive a first data set from a first data source, the first data set comprising information regarding a first set of entities; receive a second data set from a second data source, the second data set comprising information regarding a second set of entities; process the first data set to generate a processed data set, wherein processing the first data set to generate a processed data set comprises, for a first entity in the first set of entities: applying a first entity matching technique to the first data set to associate one or more data elements in the first data set with one or more corresponding elements in the second data set in accordance with a determination that the one or more data elements in the first data set and the one or more data elements in the second data set are commonly associated with the first entity; determining that a number of entities in the first data set that are classified into a first match-type classification indicating zero weak, moderate, or strong similarity-value classifications exceeds a threshold number of entities, wherein the similarity-value classifications are based on applying one or more similarity value thresholds to a respective calculated similarity value, and wherein the respective calculated similarity values are determined by comparing the first entity to a respective entity in the second data set applying a second entity-matching technique, wherein the second entity-matching technique is applied in response to the determination that the number of entities exceeds the threshold number of entities; and applying a statistical matching technique to the first data set to generate a predicted data element for the first entity of the first set of entities, wherein the predicted data element is based at least in part on one or more data elements associated with one or more entities in the second set of entities that are determined to be similar to the first entity; and store the processed data set in a database.

\* \* \* \* \*